(12) United States Patent
Oda et al.

(10) Patent No.: US 11,346,853 B2
(45) Date of Patent: May 31, 2022

(54) SAMPLE RACK

(71) Applicant: SYSMEX CORPORATION, Kobe (JP)

(72) Inventors: Kohei Oda, Kobe (JP); Hiroyuki Matsuura, Kobe (JP)

(73) Assignee: SYSMEX CORPORATION, Kobe (JP)

( * ) Notice: Subject to any disclaimer, the term of this patent is extended or adjusted under 35 U.S.C. 154(b) by 256 days.

(21) Appl. No.: 16/553,807

(22) Filed: Aug. 28, 2019

(65) Prior Publication Data

US 2020/0072857 A1 Mar. 5, 2020

(30) Foreign Application Priority Data

Aug. 31, 2018 (JP) .............................. JP2018-163497

(51) Int. Cl.
*G01N 35/02* (2006.01)
*G01N 35/00* (2006.01)

(52) U.S. Cl.
CPC ..... *G01N 35/026* (2013.01); *G01N 35/00732* (2013.01); *G01N 2035/00752* (2013.01)

(58) Field of Classification Search
CPC .......... G01N 35/026; G01N 35/00732; G01N 2035/00752
See application file for complete search history.

(56) References Cited

U.S. PATENT DOCUMENTS

| | | | | |
|---|---|---|---|---|
| 5,985,215 | A * | 11/1999 | Sakazume | G01N 35/026 422/105 |
| 2009/0129990 | A1* | 5/2009 | Kokawa | B01L 9/06 422/400 |
| 2009/0183581 | A1* | 7/2009 | Wilkinson | A61B 10/0096 73/864.91 |
| 2014/0080149 | A1 | 3/2014 | Goehde | |
| 2014/0287515 | A1* | 9/2014 | Habrich | G01N 35/04 436/47 |
| 2017/0235984 | A1* | 8/2017 | Opalsky | G06K 7/10881 235/462.24 |
| 2020/0072857 | A1* | 3/2020 | Oda | G01N 35/026 |

FOREIGN PATENT DOCUMENTS

| | | | |
|---|---|---|---|
| CN | 201603563 U | | 10/2010 |
| CN | 202315977 U | | 7/2012 |
| JP | 56062569 U | * | 5/1981 |
| JP | S56-62569 U | | 5/1981 |
| JP | S62-195701 U | | 12/1987 |
| JP | S63-152652 U | | 10/1988 |
| JP | H03-255366 A | | 11/1991 |
| JP | H09-43249 A | | 2/1997 |

(Continued)

OTHER PUBLICATIONS

Translation of JP-56062569-U (Year: 1981).*

(Continued)

*Primary Examiner* — Nathaniel T Woodward

(74) *Attorney, Agent, or Firm* — Crowell & Moring LLP

(57) ABSTRACT

A sample rack used to hold a sample container containing a sample and to transport the held sample container, includes a container holding part configured to hold the sample container; and a mark indicating an amount of the sample stored in the sample container held by the container holding part.

21 Claims, 17 Drawing Sheets

First Embodiment

(56) References Cited

FOREIGN PATENT DOCUMENTS

| JP | H10-273149 A | 10/1998 |
|---|---|---|
| JP | 3104850 U | 10/2004 |
| JP | 3114235 U | 9/2005 |
| JP | 2006-292696 A | 10/2006 |
| JP | 2007-303960 A | 11/2007 |
| JP | 2011-179919 A | 9/2011 |
| JP | 2015-087306 A | 5/2015 |

OTHER PUBLICATIONS

The Japanese Office Action dated Feb. 4, 2020 in a counterpart Japanese patent application No. 2018-163497.
The extended European search report dated Jan. 8, 2020 in a counterpart European patent application No. 19194333.1.
The Communication pursuant to Article 94(3) EPC dated Jan. 18, 2022 in a counterpart European patent application No. 19194333.1.

* cited by examiner

First Embodiment

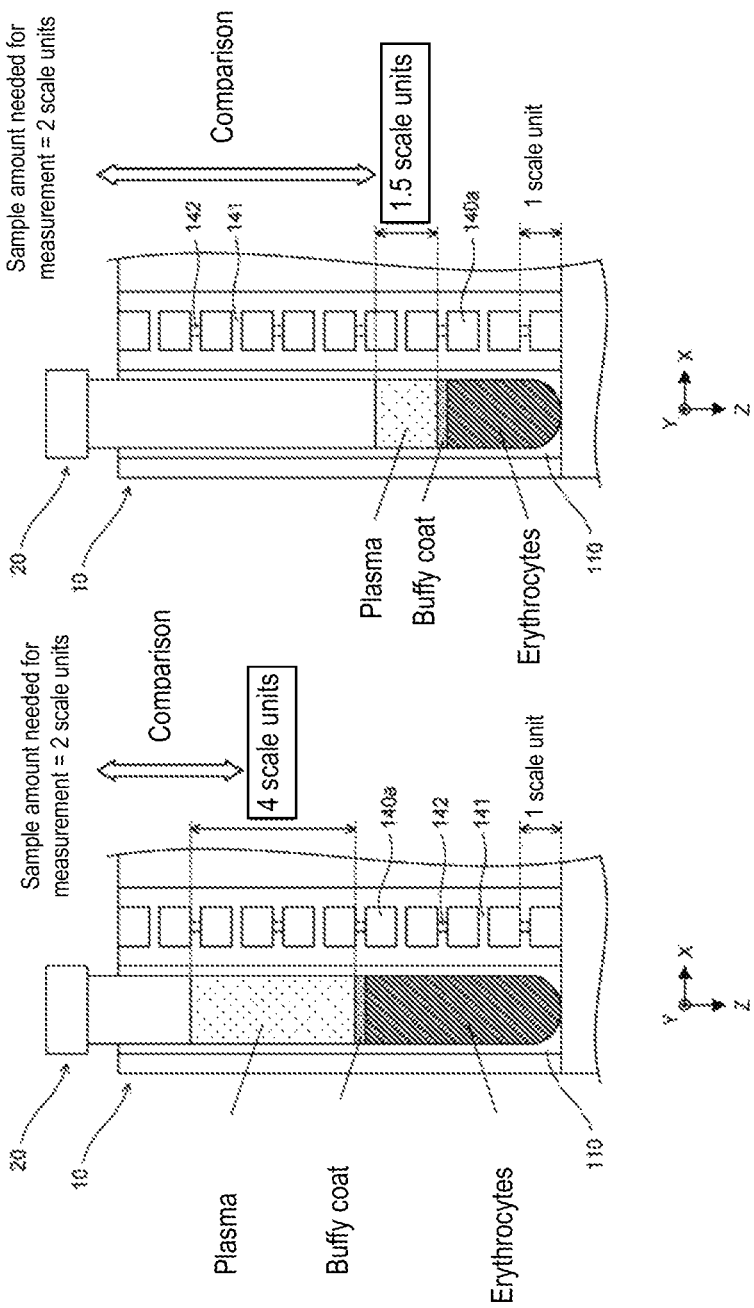

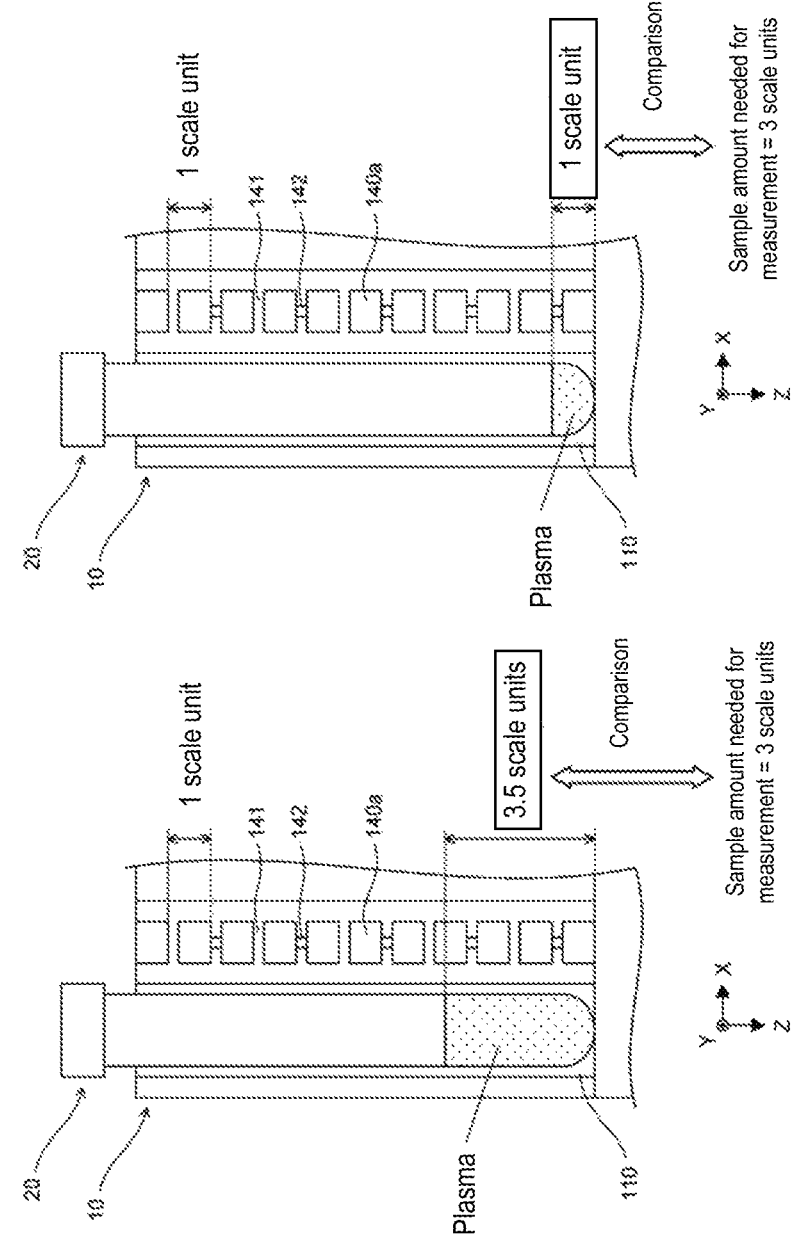
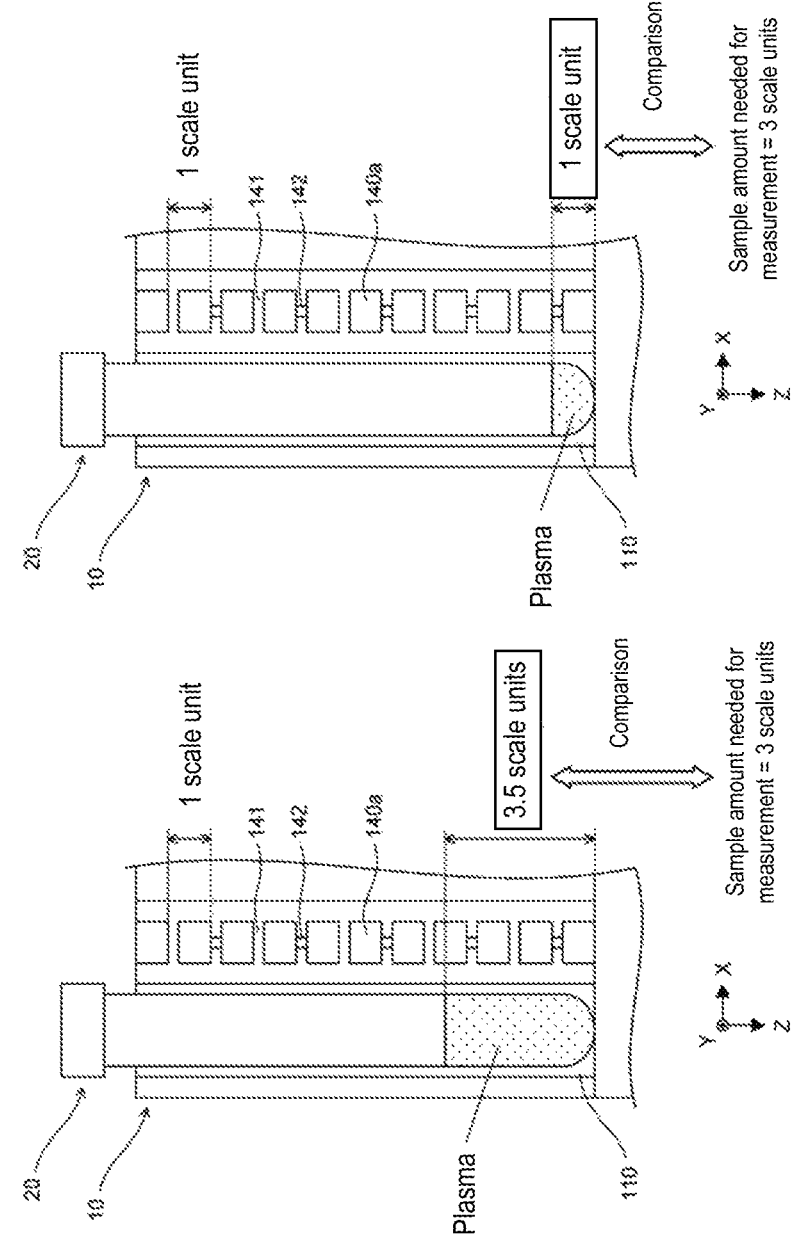
FIG. 4A
FIG. 4B

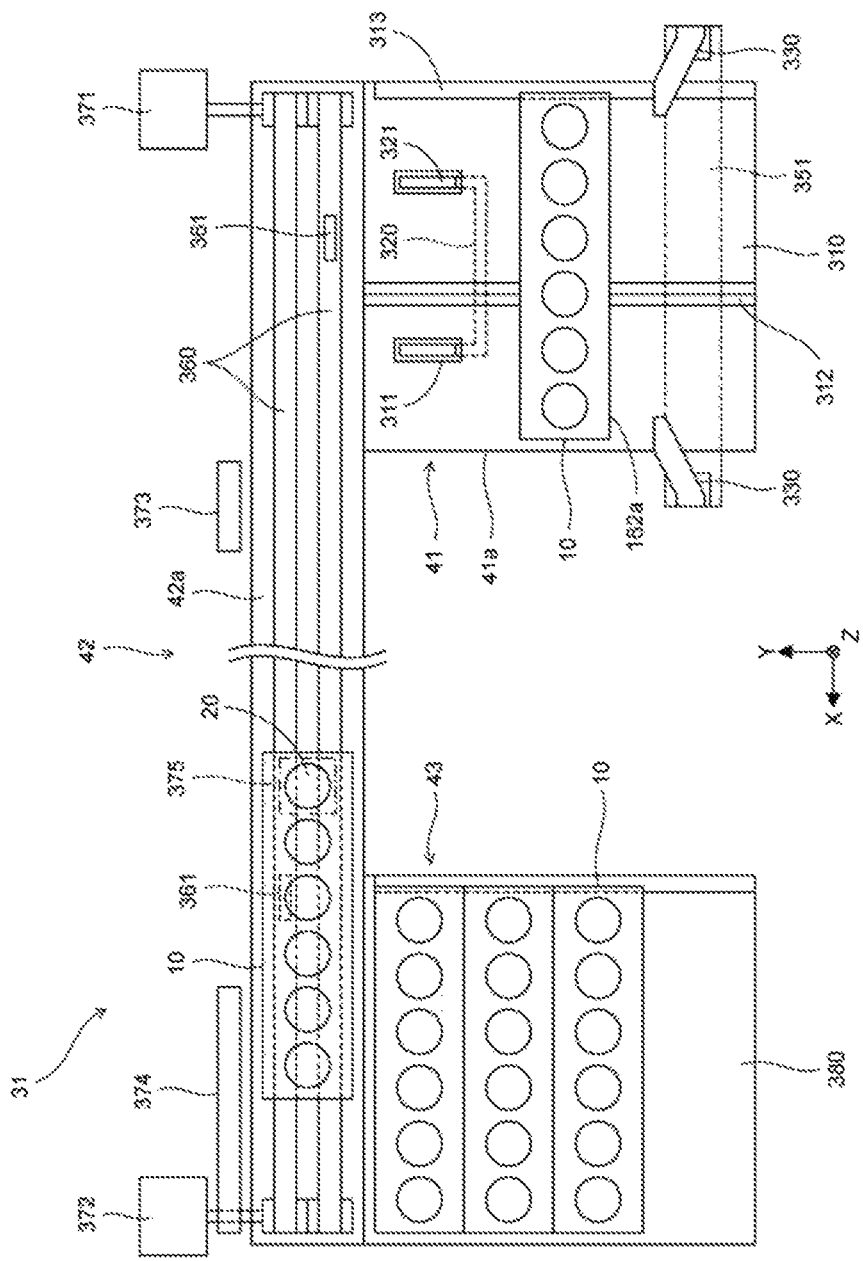

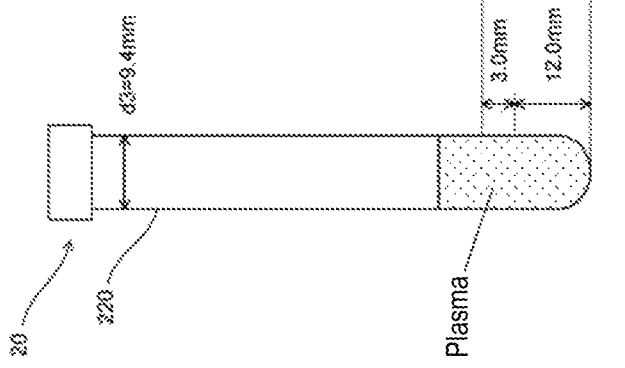
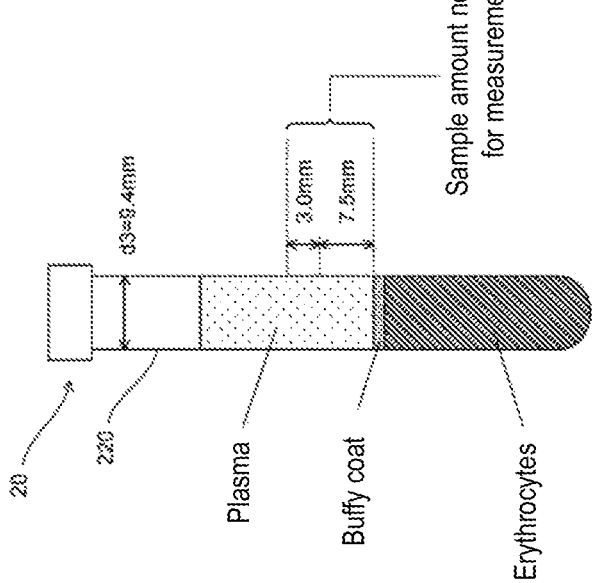

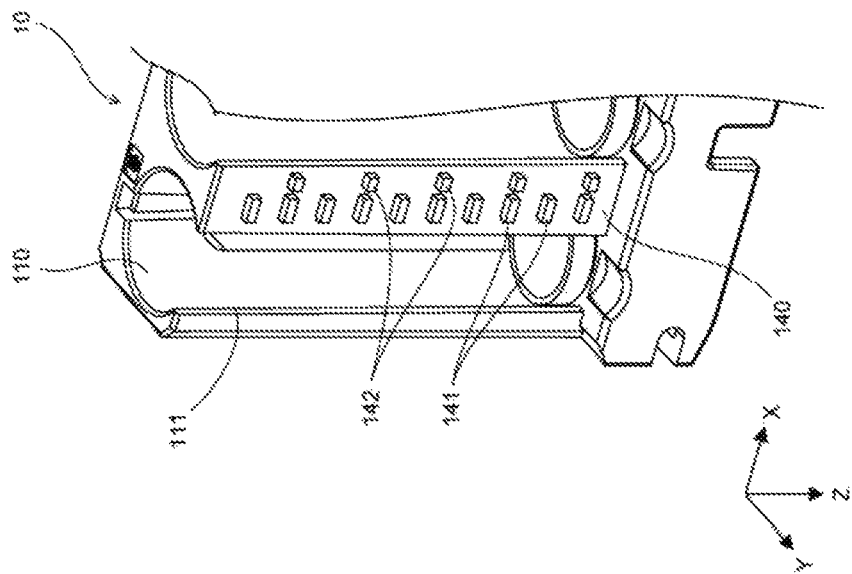
FIG. 11A  Second embodiment
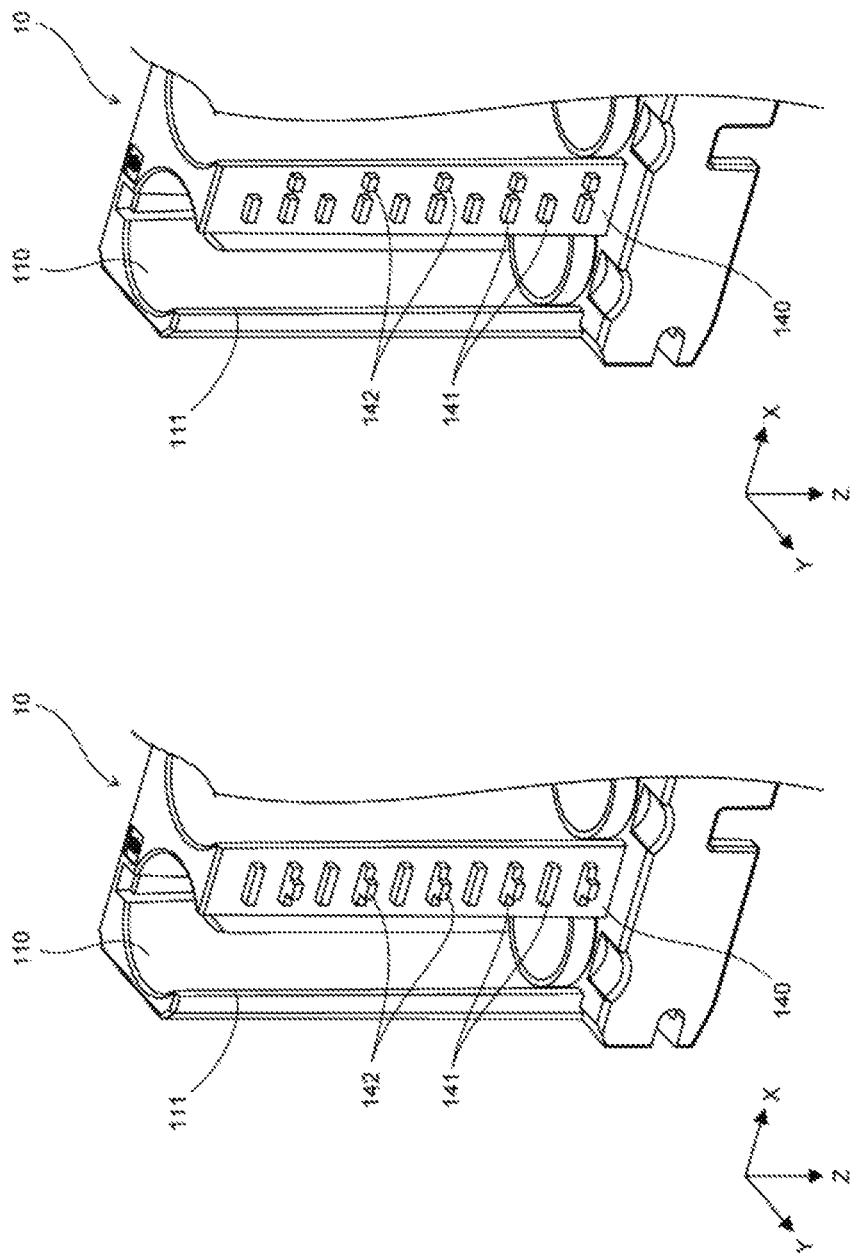
FIG. 11AB

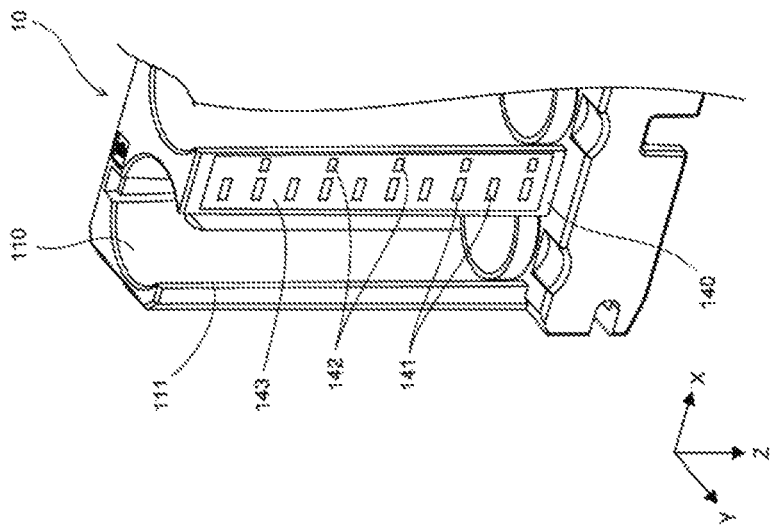
FIG. 12B  Third embodiment
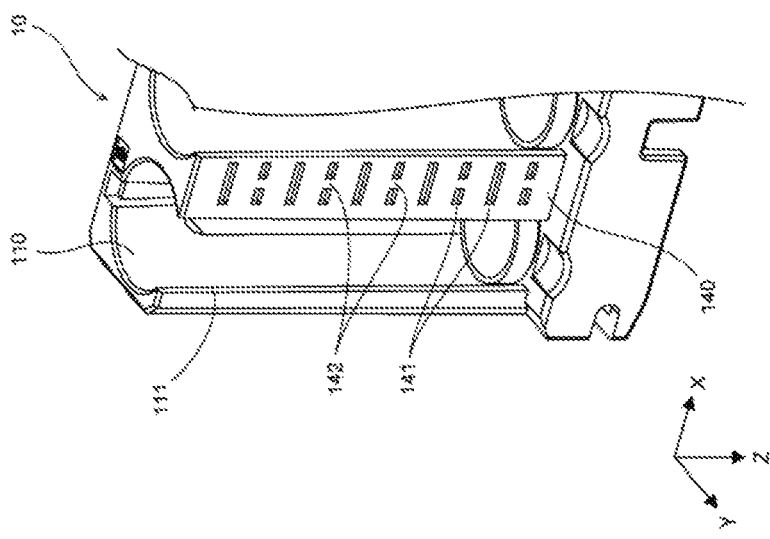
FIG. 12A

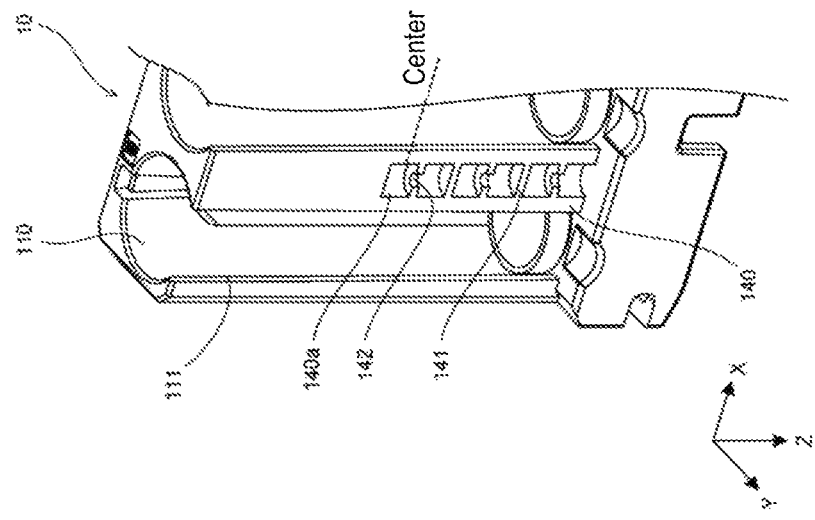
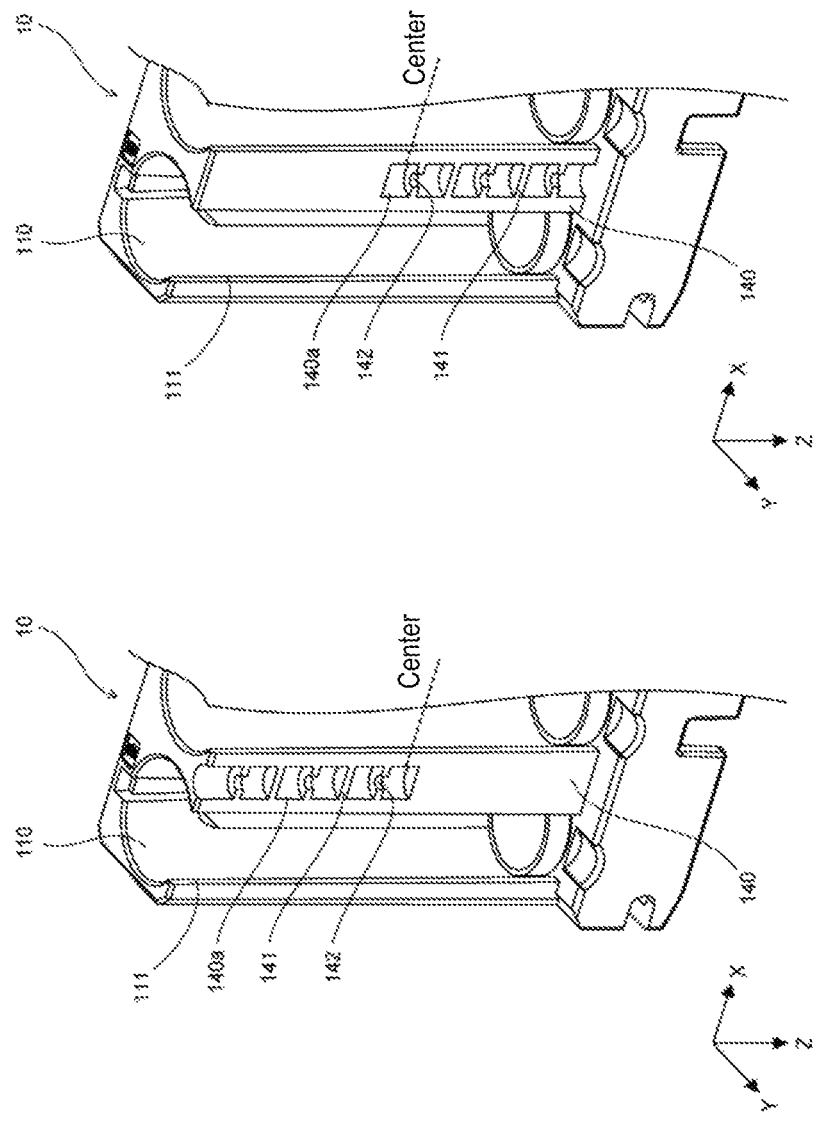

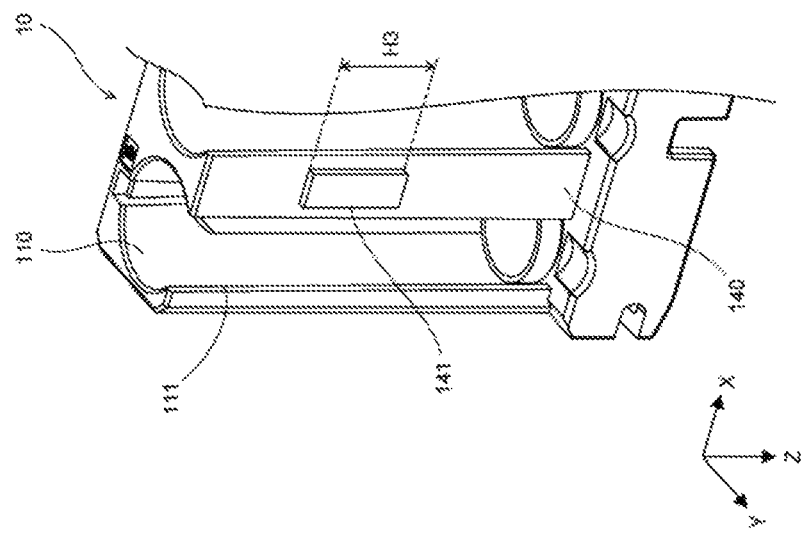
FIG. 14B
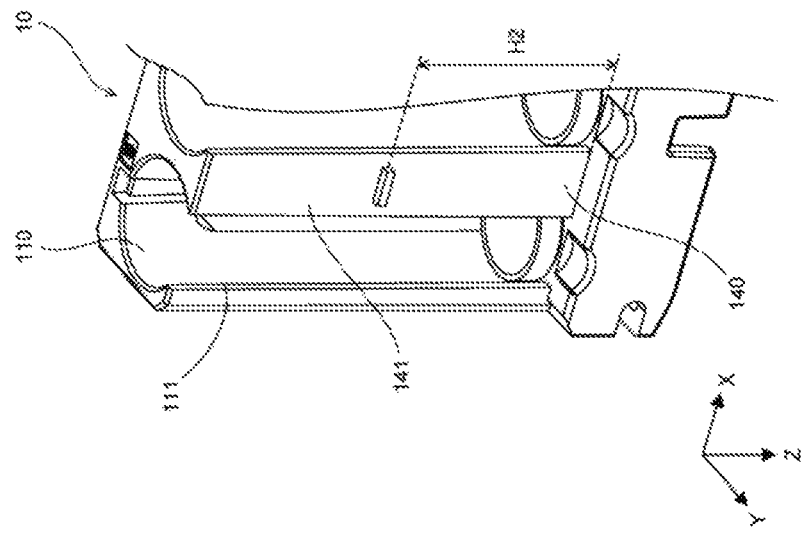
FIG. 14A  Fifth embodiment

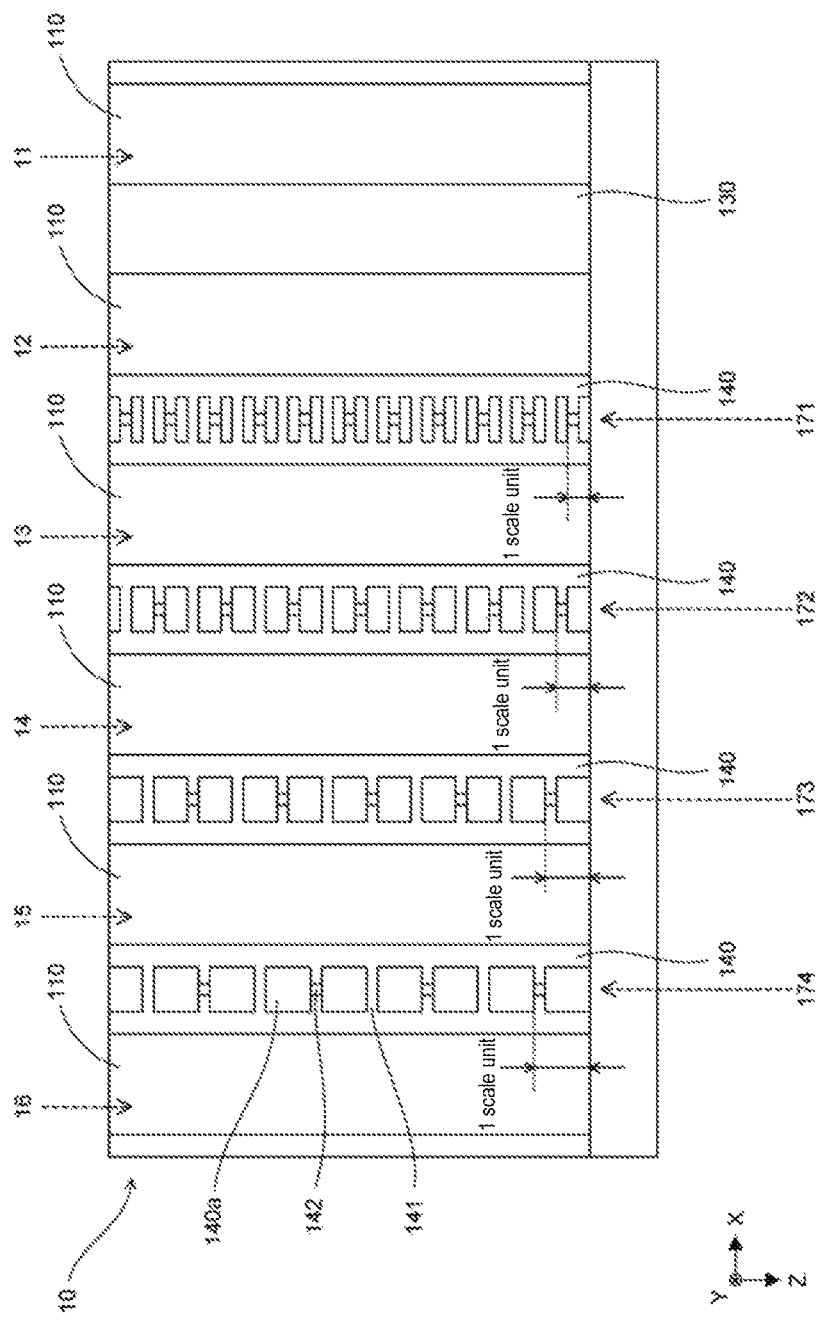
FIG. 15 Sixth embodiment

FIG. 16A Seventh embodiment
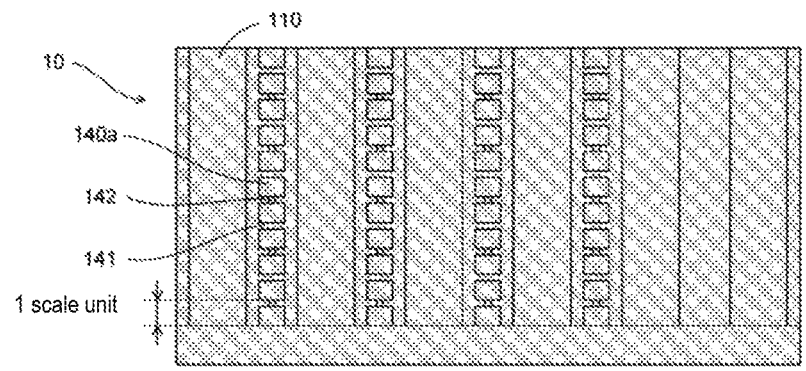
FIG. 16B
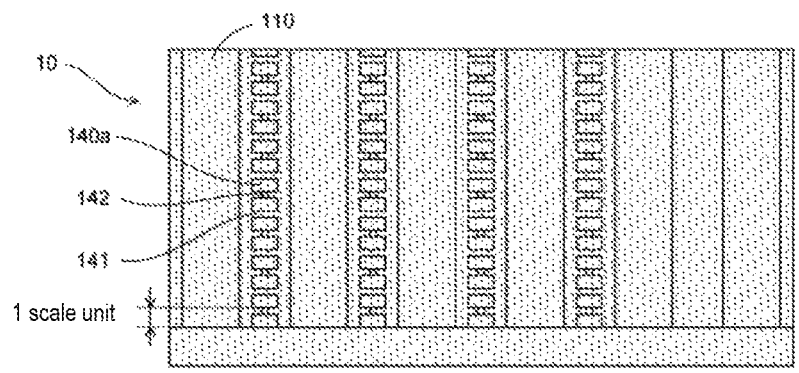
FIG. 16C
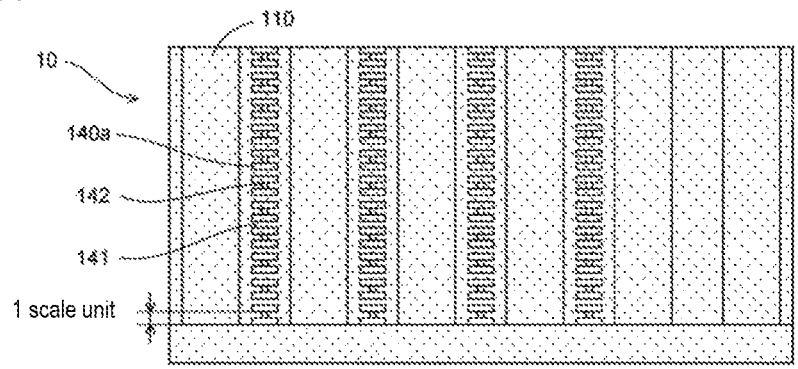

SAMPLE RACK

RELATED APPLICATIONS

This application claims priority from prior Japanese Patent Application No. 2018-163497, filed on Aug. 31, 2018, entitled "Sample Rack", the entire contents of which are incorporated herein by reference.

BACKGROUND OF THE INVENTION

1. Field of the Invention

The present invention relates to a sample rack used to transport a sample.

2. Description of the Related Art

Japanese Patent Application Publication No. 2011-179919 discloses a sample analyzer for optically measuring and analyzing a plasma sample using a coagulation method, a synthetic substrate method, an immunoturbidimetric method, and an agglutination method by irradiating light on a measurement sample prepared by adding reagent to a plasma sample. As shown in FIG. 17, in this sample analyzer, a sample container 520 is transported while being held by a sample rack 510, and the sample container 520 is transported to the suction position by a suction unit.

SUMMARY OF THE INVENTION

In general, in an apparatus for performing measurement on blood coagulation test, immunological test, and biochemical test, normal measurement cannot be performed unless a certain amount or more of the sample is accommodated in the sample container. Therefore, when the sample container is held in the sample rack, it is necessary for the operator to confirm whether a certain amount of sample is stored in the sample container. However, such a confirmation operation is problematic in that it requires the operator, for example, to place a ruler on the sample container to measure the amount of sample.

A first aspect of the present invention relates to a sample rack used to hold a sample container (20) containing a sample and to transport the held sample container (20). The sample rack (10) according to the present aspect includes the container holding part (110) for holding a sample container (20), and a mark (141) for measuring the amount of the sample stored in the sample container (20) held by the container holding part (110).

According to the sample rack of the present aspect, the operator can comprehend the amount of sample in the sample container quickly and simply by comparing the liquid level of the sample in the sample container held in the container holding part with the position of the mark. Hence, the burden on the operator when checking the sample amount can be reduced.

The sample rack (10) according to this aspect may be configured to include a plurality of marks (141). In this way, the amount of sample in the sample container can be easily grasped.

In this case, the plurality of marks (141) may be arranged at equal intervals. In this way, the amount of sample in the sample container can be comprehended more easily.

In the sample rack (10) according to this aspect, the intervals between the plurality of marks (141) may be 1 mm or more and 10 mm or less. The length in the vertical direction of the sample to be measured in the sample container is, for example, in the range of several millimeters to several tens of millimeters, depending on the type of sample container. When the distance between the plurality of marks is set to 1 mm or more and 10 mm or less, the operator can easily grasp the amount of the sample in the sample container.

In the sample rack (10) according to this aspect, the intervals between the plurality of marks (141) may be 2 mm or more and 5 mm or less. For example, when the sample is plasma and the separated plasma is positioned in the upper layer in the sample container, it is preferable that a nozzle suctions 5 mm or more away from the buffy coat located at the boundary between the plasma portion and the blood cell portion. As described above, when the interval between the plurality of marks is set to 2 mm or more and 5 mm or less, it can be easily grasped in advance whether there is a plasma layer 5 mm or more in the upward direction from the buffy coat.

The sample rack (10) according to the present aspect may be configured to include identifiers (142) respectively arranged for particular marks (141) among the plurality of marks (141), the particular marks (141) arranged with a predetermined number of marks (141) therebetween. In this case, since the identifiers are arranged at equal intervals with respect to the marks, the number of marks corresponding to the sample amount can be easily counted. Hence, the sample amount can be comprehended more quickly and easily.

In the sample rack (10) according to this aspect, the plurality of marks (141) are configured to include a first mark group in which the marks (141) are vertically aligned, and a second mark group in which the marks (141) are vertically aligned, wherein the interval of the plurality of marks 141 of the first group of marks and the interval of the marks 141 of the second group of marks are mutually different. In this case, the operator uses the mark of the first mark group or the mark of the second mark group according on the width of the sample in the sample container in the vertical direction, thereby using the mark appropriate for the sample container and the amount of sample can be properly grasped.

In the sample rack (10) according to the present aspect, the color given to the sample rack (10) may be set according to the type of interval of the plurality of marks (141). In this case, the operator can appropriately comprehend the amount of sample in the sample container using the appropriate mark on the sample container by properly using the sample rack according to the width in the vertical direction of the sample in the sample container. Since the operator can distinguish sample racks with different mark intervals by color, an appropriate sample rack can be reliably used.

In the sample rack (10) according to this aspect, the plurality of marks (141) may be arranged side by side in the vertical direction of the sample rack (10). In this way, the amount of sample in the sample container can be comprehended smoothly.

In the sample rack (10) according to the present aspect, the mark (141) may be provided at least on the upper side with respect to the center in the vertical direction of the container holding part (110). In this way, for example, when the sample is plasma and the separated plasma is positioned in the upper layer in the sample container, the amount of plasma in the sample container can be comprehended by the marks.

In the sample rack (10) according to this aspect, the mark (141) may be provided at least below the center of the container holding part (110) in the vertical direction. In this way, for example, when the sample container contains only a small amount of sample, the amount of the sample in the sample container can be comprehended by the mark.

In the sample rack (10) according to the present aspect, the marks (141) may be arranged starting from the bottom surface of the container holding part (110). In this case, the height of the bottom surface of the container holding part substantially coincides with the height of the bottom surface of the sample container installed in the container holding part. Therefore, the amount of sample in the sample container can be confirmed starting from the bottom surface of the sample container installed in the container holding part.

In the sample rack (10) according to this aspect, the mark (141) may be configured by a predetermined shape formed on the sample rack (10) or a predetermined ornamentation attached to the sample rack (10). The predetermined shape is, for example, a recess or a protrusion. The predetermined ornamentation is, for example, a label or a graphic printed on the label.

In the sample rack (10) according to this aspect, the mark (141) may be configured by an unevenness formed on the sample rack (10). In this way, the durability of the mark can be enhanced.

In the sample rack (10) according to this aspect, the mark (141) may be provided adjacent to the container holding part (110). In this case, the amount of sample in the sample container held by the container holding part can be comprehended smoothly.

The sample rack (10) according to the present aspect may be configured to include a plurality of container holding parts (110). In this way, a plurality of samples can be transported by transporting one sample rack.

In this case, the mark (141) may be disposed between two adjacent container holding parts (110). In this way, the amount of sample in the sample container held by the two adjacent container holding parts can be comprehended using the mark. In this way, the sample rack can be simply configured as compared with when the marks are arranged to correspond individually to all the container holding parts.

The sample rack (10) according to this aspect may be configured to include a space (130) for adhering an identification member (101) for identifying the sample rack (10). The identification member is, for example, a bar-code label on which a bar-code is printed, or an RFID tag. When the space is provided in this way, the sample rack can be easily identified by adhering the identification member in this space.

In the sample rack (10) according to this aspect, the width of the sample rack (10) can be configured to be transportable by the transport unit (31) for transporting the sample container (20).

The sample rack (10) according to this aspect includes a plurality of container holding parts (110) each configured to hold a sample container, and a side surface (10a) provided with a plurality of openings (111) in correspondence with the plurality of container holding parts to allow an information reading unit (373) provided in the sample analyzer (30) to read an identification member (201) attached to a sample container (20) held by the container holding part (110) for identifying a sample, and the mark (141) may be configured to be disposed between the openings (111). In this way, the amount of sample in the sample container held by the two adjacent container holding parts can be comprehended using the mark. In this way, the sample rack can be simply configured as compared with when the marks are arranged to correspond individually to all the container holding parts.

In this case, the sample rack (10) according to this aspect is configured to have a space (130) for attaching the identification member (201) identifying the sample rack (10) on the side surface (10a) provided with the opening (111). Then, the information reading unit of the sample analyzer can read both the identification member of the sample rack and the identification member of the sample container from one side of the sample rack.

The sample rack (10) according to the present aspect may be configured to include an engagement part (133) for engaging a protrusion (312) provided on the bottom surface (41a) of the rack storage unit (41) and extending in a direction toward a transport path (42a), used in a sample analyzer (30) including a rack storage unit (41) for storing a sample rack (10) for holding a sample, and a transport path (42a) for transporting the sample rack (10) stored in the rack storage unit (41). In this way, the movement of the sample rack in the rack storage unit is performed with the engagement part along the protrusion provided on the bottom surface of the rack storage unit. Therefore, the operator can reliably set the sample rack in the rack storage unit by sliding the sample rack relative to the regulating member in a state where the engagement part is along the protrusion. The feeding member for transporting the sample rack set in the rack storage unit to the transport path also can reliably transport the sample rack to the transport path along the transport direction.

The sample rack (10) according to the present aspect may be configured to include an engagement part (135) for engaging a protrusion (313) provided on the side portion of the rack storage unit (41) and extending in a direction toward a transport path (42a), used in a sample analyzer (30) including a rack storage unit (41) for storing a sample rack (10) for holding a sample, and a transport path (42a) for transporting the sample rack (10) stored in the rack storage unit (41). In this case, the movement of the sample rack in the rack storage unit is performed in a state where the engagement part is along the protrusion provided on the side portion of the rack storage portion. Therefore, the operator can reliably set the sample rack in the rack storage unit by sliding the sample rack relative to the regulating member in a state where the engagement part is along the protrusion. The feeding member for transporting the sample rack set in the rack storage unit to the transport path also can reliably transport the sample rack to the transport path along the transport direction.

In the sample rack (10) according to this aspect, the sample container (20) is a sample container subjected to a centrifugal separation process to separate plasma from whole blood, and the mark (141) may be configured to be able to measure the amount of plasma contained in the sample container (20).

A second aspect of the present invention relates to a sample rack used to hold a sample container (20) containing a sample, and to transport the held sample container (20). The sample rack (10) according to this aspect includes a container holding part (110) to hold a sample container (20) containing a sample, a plurality of marks (141) arranged at equal intervals, and an identifier (142) arranged for each of the plurality of marks (141) lined up in a predetermined number.

According to the sample rack of the present aspect, as with the sample rack according to the first aspect, the operator can quickly and simply comprehend the amount of sample in the sample container using the marks. Since the identifiers are arranged at equal intervals for a plurality of marks, the number of marks corresponding to the amount of sample can be easily counted. Hence, the sample amount can be comprehended more quickly and easily.

In the sample rack (10) according to this aspect, the predetermined number may be one.

In the sample rack (10) according to this aspect, the identifier (142) may be configured by a predetermined shape formed on the sample rack (10), or a predetermined ornamentation attached to the sample rack (10). The predetermined shape is, for example, a recess or a protrusion. The predetermined ornamentation is, for example, a label or a graphic printed on the label.

In the sample rack (10) according to this aspect, the identifier (142) may be configured by an unevenness formed on the sample rack (10). In this way the durability of the identifier can be improved.

A third aspect of the present invention relates to a sample rack used to hold a sample container (20) containing a sample, and to transport the held sample container (20). The sample rack (10) according to the present aspect includes a container holding part (110) for holding a sample container (20) containing a sample, and a plurality of marks (141) equally spaced from the bottom surface of the container holding part (110).

According to the sample rack of the present aspect, as with the sample rack according to the first aspect, the operator can quickly and simply comprehend the amount of sample in the sample container using the marks. The height of the bottom surface of the container holding part substantially matches the height of the bottom surface of the sample container installed in the container holding part. Therefore, the amount of sample in the sample container can be confirmed starting from the bottom surface of the sample container installed in the container holding part. Since the plurality of marks are arranged at equal intervals, the amount of sample in the sample container can be easily comprehended.

A fourth aspect of the present invention relates to a sample rack used to hold a sample container containing a sample and to transport the held sample container, comprising a plurality of container holding parts each configured to hold a sample container containing a sample; and more than one marks that are arranged at a same height position with each other, each mark being disposed between two adjacent container holding parts.

According to the sample rack of the present aspect, the same effect as the sample rack according to the first aspect is achieved.

According to the present invention, it is possible to reduce the burden on the operator when confirming the amount of sample.

BRIEF DESCRIPTION OF THE DRAWINGS

FIG. 3A and FIG. 3B illustrate a procedure for determining whether the plasma separated in the upper layer according to the first embodiment is contained in a sample container in sufficient quantity for measurement;

FIG. 4A and FIG. 4B are schematic drawings that illustrate a procedure for determining whether the sample container holds an amount of transferred plasma sufficient for measurement;

FIG. 8 is a schematic view showing a configuration of a transport unit according to the first embodiment;

FIG. 10A and FIG. 10B are schematic diagrams illustrating the amount of sample required for measurement according to the first embodiment, and the number of scale units corresponding to the amounts of sample required for measurement;

FIG. 11A is a perspective view showing a configuration of a mark and an identifier according to a second embodiment; FIG. 11B is a perspective view showing a configuration of a mark and an identifier according to a modification of the second embodiment;

FIG. 12A is a perspective view showing a configuration of a mark and an identifier according to a modification of the second embodiment; FIG. 12 (b) is a perspective view which shows a configuration of a mark and an identifier according to a third embodiment;

FIG. 13A is a perspective view showing a configuration of a mark and an identifier according to a fourth embodiment; FIG. 13B is a perspective view showing a configuration of a mark and an identifier according to a modification of the fourth embodiment;

FIG. 14A is a perspective view showing a configuration of a mark and an identifier according to a fifth embodiment; FIG. 14B is a perspective view showing a configuration of a mark and an identifier according to a modification of the fifth embodiment;

FIG. 15 is a side view schematically showing a configuration of a sample rack according to a sixth embodiment;

FIG. 16A through FIG. 16C are side views schematically showing a configuration of a sample rack according to a seventh embodiment.

DETAILED DESCRIPTION OF THE PREFERRED EMBODIMENTS

First Embodiment

Figure 1:
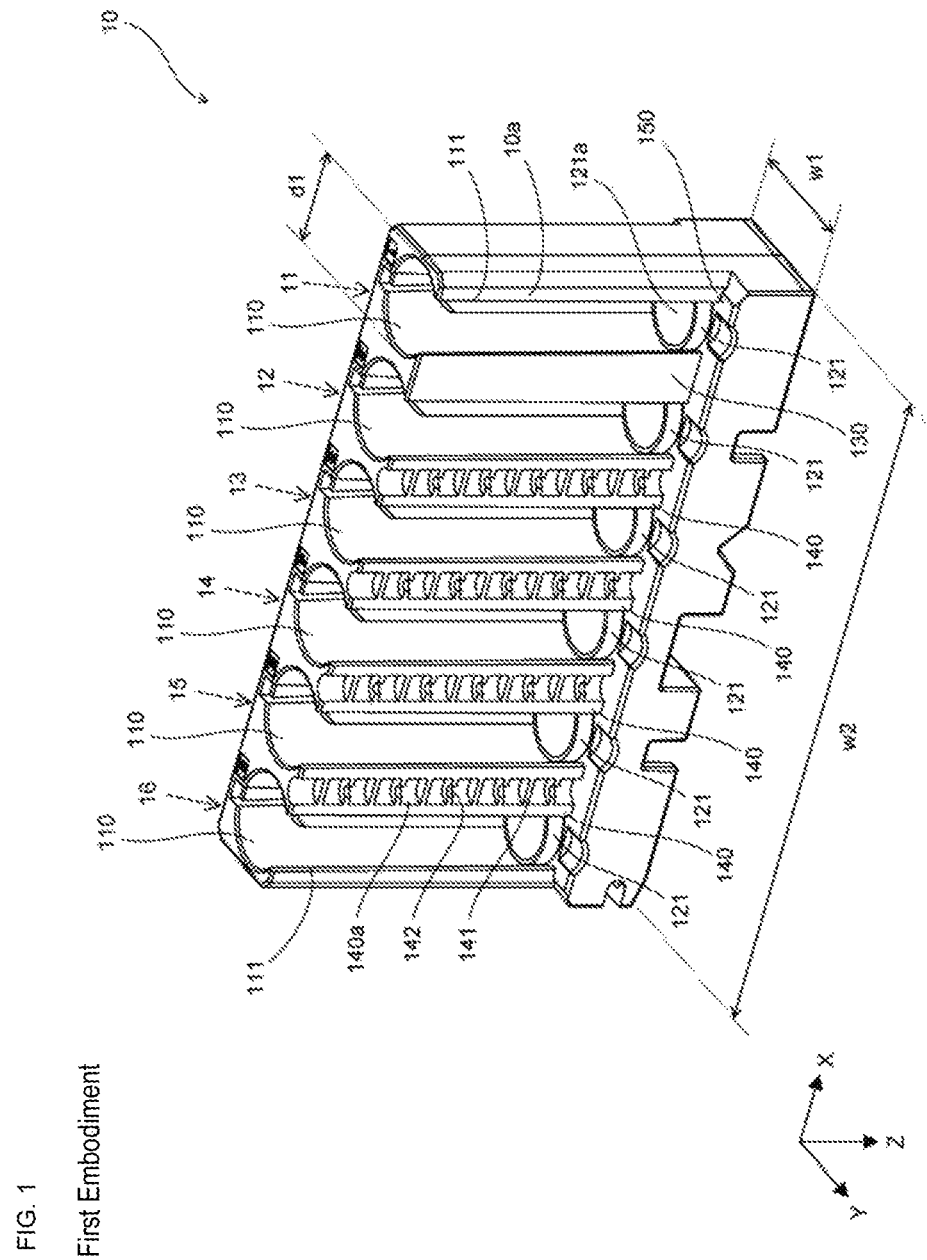
FIG. 1 is a perspective view showing the configuration of a sample rack according to a first embodiment.

The sample rack 10 described below is a rack for holding a sample container 20 and is used in a sample analyzer 30. The sample analyzer 30 includes a transport unit 31 and a measuring unit 32. The sample container 20 held in the sample rack 10 is transported by the measurement unit 32 to a position for suctioning the sample when the transport unit 31 transports the sample rack 10. That is, the sample rack 10 is used to transport the sample to the measurement unit 32. The sample container 20 will be described later with reference to FIG. 2A. The sample analyzer 30, the transport unit 31, and the measurement unit 32 will be described later with reference to FIG. 5 and FIG. 6.

In FIG. 1, the XYZ axes are orthogonal to each other, and the X-axis direction and the Y-axis direction correspond to directions parallel to the horizontal plane. The positive direction of the X-axis corresponds to the left direction, the positive direction of the Y-axis corresponds to the backward direction, and the positive direction of the Z-axis corresponds to the vertically downward direction. Note that, in the other drawings, the XYZ axes are set as in FIG. 1.

As shown in FIG. 1, the sample rack 10 includes a container holding part 110, a support member 121, a space 130, a flat surface 140, a mark 141, an identifier 142, and a shelf 150.

The outer shape of the sample rack 10 is substantially a rectangular shape, and the width w2 in the X-axis direction is longer than the width w1 in the Y-axis direction. Since the sample rack 10 is transported by the transport unit 31 described later, the widths w1 and w2 of the sample rack 10 are configured to be transportable by the transport unit 31. More specifically, the sample rack 10 is transported by the transport unit 31 in the X-axis direction along the transport region in which the width in the Y-axis direction is small. Therefore, the width w1 in the short direction of the sample rack 10 is configured to be small to be transportable by the transport unit 31 described later. In the first embodiment, the width w1 is 25 mm.

The container holding part 110 is a hole formed downward from the upper surface of the sample rack 10, and six of the container holding parts 110 are formed along the X-axis direction. The container holding part 110 holds the sample container 20 described later in an upright state in the Z-axis direction. An opening 111 is formed on the Y axis positive side of the container holding part 110. When the sample container 20 is held by the container holding part 110, the side surface of the sample container 20 is open in the positive Y-axis direction through the opening 111. The opening 111 is provided for reading a bar-code from the identification member 201 attached to the sample container 20 via the information reading unit 373 described later.

Hereinafter, the positions of the six container holding parts 110 aligned in the X-axis negative direction from the container holding part 110 on the X axis positive side will be referred to as positions 11 to 16, respectively. The container holding parts 110 at the positions 11 to 16 have the same shape, and the diameter when viewed in the Z-axis direction is designated d1. Specifically, the diameter d1 of the first embodiment is 16 mm.

When the sample rack 10 includes a plurality of container holding parts 110, a plurality of samples can be transported to the measurement unit by transporting a single sample rack 10. Note that the number of container holding parts 110 formed in the sample rack 10 is not limited to six, and may be another number.

The support member 121 is a circular member installed on the lower surface of the container holding part 110. A recess 121a is formed on the upper surface of the support member 121, and when the sample container 20 is held by each of the container holding parts 110, the bottom surface of the sample container 20 is supported by the recess 121a of the support member 121. That is, the recess 121a configures the bottom of the container holding part 110. When the sample container 20 is supported by the recess 121a, the lower bottom end of the sample container 20 is positioned at substantially the same height as the shelf 150.

A side face 10a parallel to the XZ plane is formed on the Y-axis positive side of the sample rack 10. An opening 111, a space 130, and a flat surface 140 are provided on the side surface 10a. The space 130 is a plane provided between the opening 111 of the container holding part 110 at position 11 and the opening 111 of the container holding part 110 at position 12, and is parallel to the XZ plane. The space 130 is an area having a predetermined area and to which an identification member 101 described later is attached. The space 130 need not be necessarily a flat surface, and may be a surface having irregularities, or a curved surface. When the space 130 is provided, the sample rack 10 can be easily identified by affixing the identification member 101 in the space 130.

The flat surface 140 is a surface provided between the openings 111 of the container holding part 110 at the positions 12 to 16 and parallel to the XZ plane. A plurality of marks 141 and a plurality of identifiers 142 are formed in the flat surface 140. The mark 141 and the identifier 142 are disposed between two adjacent openings 111.

Eleven recesses 140a concave in the negative Y-axis direction are formed side by side in the Z-axis direction in one flat surface 140. At this time, a part of the flat surface 140 remains between the adjacent recesses 140a in the Z-axis direction. The mark 141 is configured by a portion of the flat surface 140 located between two adjacent recesses 140a in the Z-axis direction As a result, a plurality of marks 141 are arranged side by side in the vertical direction of the sample rack 10, and arranged in the depth direction of the sample in the sample container 20 held by the container holding part 110. The recess 140a aligned side by side from the shelf 150 of the sample rack 10 to the upper surface of the sample rack 10. In this way the plurality of marks 141 are provided in the upward direction starting from the bottom surface of the container holding part 110. The distance between two marks 141 aligned in the vertical direction, that is, the distance between individual scale units, is 5 mm.

The identifier 142 is configured by a notch formed in the mark 141. The identifier 142 is arranged with respect to every other one of the plurality of marks 141. That is, the identifier 142 is formed at the first, third, fifth, seventh and ninth marks 141 from the bottom. Note that the identifier 142 is not limited to being arranged relative to every other mark 141, and may be arranged with respect to every other plural marks 141.

Figure 2A:
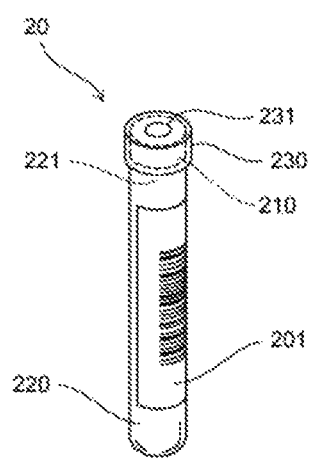
FIG. 2A is a perspective view showing the configuration of a sample container according to the first embodiment.

As shown in FIG. 2A, the sample container 20 includes an identification member 201, a stopper 210, a body 220, and a lid 230.

The body 220 is a blood collection tube made of light-transmitting glass or synthetic resin, and accommodates a sample. An opening 221 is formed at the upper end of the body 220. The stopper 210 is made of an elastic synthetic resin or the like. The stopper 210 seals the opening 221 at the upper end of the body 220 containing the sample. The lid 230 is made of plastic and covers the stopper 210 attached to the body 220 from the upper side. At the center of the lid 230, a hole 231 penetrating vertically is formed. The identification member 201 is affixed to the side surface of the body 220. The identification member 201 is a bar-code label on which a bar-code indicating sample information is printed. The sample information is information that can individually identify the sample. Note that the identification member 201 is not limited to a bar-code label, and may be, for example, an RFID tag insofar as it is a member for identifying a sample.

Figure 2B:
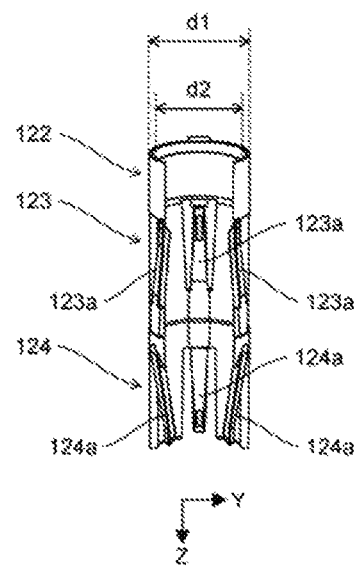
FIG. 2B is a perspective view showing the configuration of the holder according to the first embodiment.

As shown in FIG. 2B, the holders 122, 123, and 124 are used to change the inner diameter of the container holding part 110 in accordance with the outer diameter of the sample container 20 held by the container holding part 110. The diameter of the outer surface of the holders 122, 123, and 124 is substantially the same as the diameter d1 of the inner surface of the container holding part 110. The diameter of the inner surface of the holder 122 is d2 and smaller than d1. Three leaf springs 123a are formed on the inner peripheral portion of the holder 123, and three leaf springs 124a are formed on the inner peripheral portion of the holder 124.

Figure 2C:
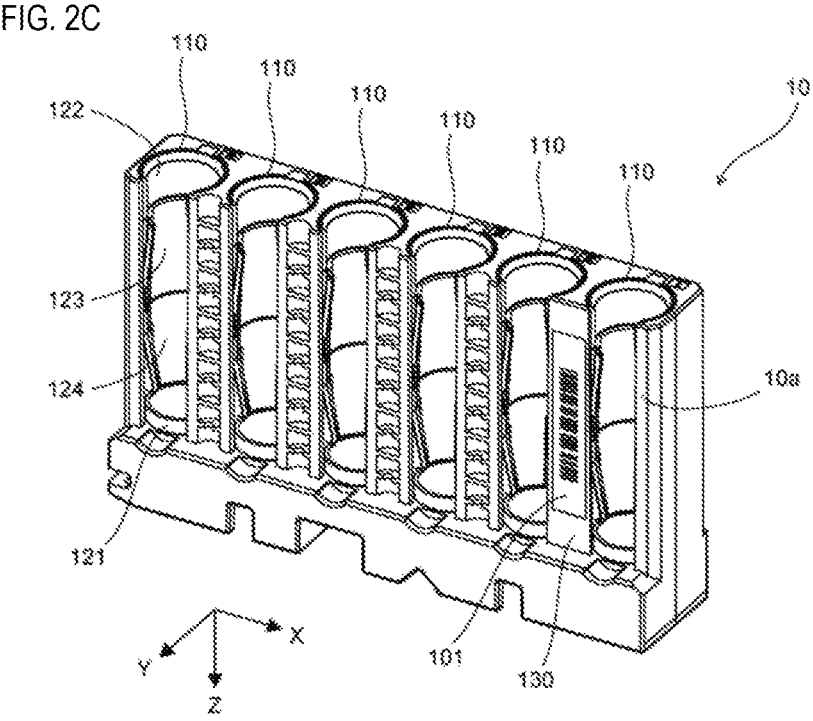
FIG. 2C is a perspective view showing a state where the holder and the bar code label are installed in the sample rack according to the first embodiment.

As shown in FIG. 2C, when changing the inner diameter of the container holding part 110, the holders 122 to 124 are installed in the six container holding parts 110. In this way, the outer diameter of the sample container 20 held by the container holding part 110 is changed from d1 to d2. Positional displacement of the sample container 20 held by the container holding part 110 can be prevented by the plate springs 123a and 124a. The outer diameter of the sample container 20, that is, the diameter of the outer surface of the body 220 of the sample container 20 may be, for example, 11 mm, 13 mm, 16 mm, or the like. When the outer diameter of the sample container 20 is 11 mm and 13 mm, holder 122 whose inner surface diameter d2 is 11 mm and 13 mm, respectively, is used. When the outer diameter of the sample container 20 is 16 mm, the holders 122 to 124 are not used.

When the sample rack 10 is identified, the identification member 101 is attached to the space 130 of the sample rack 10. The identification member 101 is a bar-code label on which a bar-code indicating rack information is printed. The rack information is information that can individually identify the sample rack 10. Note that the identification member 101 is not limited to a bar-code label, and may be, for example, an RFID tag insofar as the member identifies the sample rack 10.

Also note that the holders 122 to 124 and the identification member 101 are not usually installed when the sample rack 10 is shipped. The holders 122 to 124 and the identification member 101 are installed in accordance with the operation of a facility or the like in which the sample rack 10 is used. For example, when sample containers 20 with different outer diameters are used in a certain facility and the sample racks 10 are individually identified, the holders 122 to 124 are appropriately installed in the facilities, and the identification member 101 is attached to the sample rack 10. On the other hand, when the sample container 20 to be used is determined in advance and it is determined in advance that the sample rack 10 is to be identified, the appropriate holders 122 to 124 are installed in the container holding part 110 and the identification member 101 may be attached to the space 130 in advance before the sample rack 10 is shipped.

Next, a procedure for determining whether the sample to be measured is stored in the sample container 20 by using the mark 141 and the identifier 142 will be described with reference to FIG. 3A and FIG. 3B.

FIGS. 3A and 3B show a state in which the sample container 20 after centrifugation is held by the container holding part 110 at position 16 of the sample rack 10, and the sample stored in the sample container 20 is plasma. Hereinafter, this case will be described.

Whole blood collected from a subject is contained in a sample container 20 containing sodium citrate. The operator performs centrifugal separation on the sample container 20 to separate plasma from which blood cell components have been removed from citrated plasma as supernatant. Then, the operator sets the sample container 20 which has been subjected to the centrifugal separation process to separate plasma from whole blood, in the sample rack 10. At this time, the operator sets the sample container 20 after centrifugation in the container holding part 110 of the sample rack 10 so that the condition in the sample container 20 can be known. That is, the operator sets the sample container 20 in the container holding part 110 such that the identification member 201 of the sample container 20 is located on the opposite side of the opening 111 of the container holding part 110.

At this time, as shown in FIG. 3A and FIG. 3B, in the sample container 20, a plasma region and an erythrocyte region separated from whole blood are respectively formed on the upper side and the lower side. A layer of platelets and white blood cells called buffy coat also is formed between the plasma area and the red blood cell area.

The operator sets the distance between the top surface of the buffy coat and the top surface of the plasma, that is, the distance in the vertical direction of the plasma region, in the sample container 20 held by the container holding part 110 to the mark 141 adjacent to the container holding part 110 to measure visually using the identifier 142. That is, the mark 141 and the identifier 142 are configured to measure the amount of plasma stored in the sample container 20 held in the container holding part 110. Then, the operator compares the measured distance with the amount of sample necessary for measurement to determine whether the amount of sample necessary for measurement is present in the sample container 20.

In the case of the state shown in FIG. 3A, the operator visually perceives that the distance in the vertical direction of the plasma area corresponds to the four scale units of the mark 141. Then, the operator determines that the amount of the sample necessary for the measurement is accommodated in the sample container 20 based on the fact that the four scale units obtained by visual observation are greater than the two scale units corresponding to the amount of the sample required for the measurement. In this way when the amount of sample necessary for measurement is accommodated, the operator maintains the state in which the sample container 20 is held by the sample rack 10, and sets the sample rack 10 in the transport unit. In this way the sample in the sample container 20 is transported to the measurement unit by the sample rack 10, and the plasma in the supernatant portion is suctioned by a nozzle inserted from the upper part of the sample container 20.

On the other hand, in the state shown in FIG. 3B, the operator visually acquires that the distance in the vertical direction of the plasma region corresponds to the 1.5 scale units of the marks 141. Then, the operator determines that the amount of sample necessary for the measurement is not accommodated in the sample container 20 based on the fact that the 1.5 scale units obtained by visual observation is less than the 2 scale units corresponding to the amount of sample required for measurement. In this way, when the amount of sample necessary for measurement is not accommodated, the operator removes the sample container 20 from the sample rack 10 and prevents the sample container 20 from being transported to the measurement unit.

Here, the number of scale units corresponding to the amount of sample required for measurement is determined in advance, and is described, for example, in a manual of the sample analyzer or the like. In this case, the operator refers to a manual or the like to acquire the number of scale units corresponding to the amount of sample necessary for measurement. The number of scale units corresponding to the amount of sample required for measurement also may be displayed on a display unit of the sample analyzer. The number of scale units corresponding to the amount of sample required for the measurement is determined in accordance with the diameter of the inside surface of the body 220 of the sample container 20, the measurement order set for the sample, the dead volume produced when transporting the suctioned sample, and the dead volume resulting from blood cell suction prevention and the like. The number of scale units corresponding to the amount of sample required for measurement will be described later.

Note that the length in the vertical direction of the sample necessary for measurement also may be determined in advance and described in a manual or the like of the sample analyzer, rather than the number of scale units corresponding to the amount of sample required for measurement. In this case, the operator visually acquires the length in the vertical direction of the sample in the sample container 20 as the sample amount using the marks 141 and the identifiers 142 of the sample rack 10 based on the fact that the distance between the marks 141 is 5 mm. Then, the operator compares the length in the vertical direction of the sample obtained by visual observation with the predetermined length to determine whether the amount of sample necessary for measurement is accommodated.

Similarly, the distance in the vertical direction of the plasma area can be grasped as shown in FIG. 3A and FIG. 3B using the mark 141 and the identifier 142 located at a position close to the container holding part 110 even when the sample container 20 is held in the container holding part 110 at positions 11 to 15.

As described above, the sample rack 10 is provided with the mark 141 for measuring the amount of sample accommodated in the sample container 20 held by the container holding part 110. In this way the operator can comprehend the amount of sample in the sample container 20 quickly and simply by comparing the liquid level of the sample in the sample container 20 held in the container holding part 110 with the position of the mark 141. Hence, the burden on the operator when checking the sample amount can be reduced. The plurality of marks 141 are arranged at equal intervals in the flat surface 140. In this way the amount of sample in the sample container 20 can be easily understood.

The identifier 142 is arranged relative to the marks 141 that are arranged by opening a predetermined number of the plurality of marks 141. In this way, when the identifiers 142 are arranged at equal intervals relative to the marks 141, the number of the marks 141 corresponding to the sample amount can be easily counted. Hence, the sample amount can be comprehended more quickly and easily.

A plurality of marks 141 also are arranged side by side in the vertical direction of the sample rack 10 and arranged in the depth direction of the sample in the sample container 20 held by the container holding part 110. In this way the amount of sample in the sample container 20 can be grasped smoothly.

The mark 141 and the identifier 142 also are configured by the unevenness formed on the sample rack 10. Specifically, the mark 141 is configured as a gap between the two recesses 140a, and the identifier 142 is configured as a notch provided in the mark 141. In this way, when the mark 141 and the identifier 142 are portions formed in the sample rack 10, the durability of the mark 141 and the identifier 142 is improved as compared with when the mark 141 and the identifier 142 are configured by a label or the like.

A mark 141 and an identifier 142 also are provided on the adjacent flat surface 140 with respect to the container holding part 110 at the positions 12-16. In this way the amount of sample in the sample container 20 held at the positions 12 to 16 can be smoothly comprehended using the adjacent mark 141 and identifier 142. Note that when the sample rack 10 does not need to be provided with the identification member 101, a flat surface 140 may be provided between the container holding part 110 at the position 11 and the container holding part 110 at the position 12 instead of the space 130. In this way the amount of sample in the sample container 20 held at the position 11 can be smoothly comprehended using the mark 141 and the identifier 142 provided on the adjacent flat surface 140.

A mark 141 and an identifier 142 also are provided in the four flat surfaces 140 located between the container holding parts 110 at the positions 12 to 16, that is, between two adjacent openings 111. In this way the amount of sample in the sample container 20 held by the adjacent container holding parts 110 can be comprehended using the mark 141 and the identifier 142 provided on one flat surface 140. Hence, the sample rack 10 can be simply configured as compared with when the mark 141 and the identifier 142 are arranged to individually correspond to the container holding parts 110 at the positions 12-16.

The sample rack 10 also is provided with a space 130 for attaching an identification member 201 for identifying the sample rack 10 on a side surface 10a provided with an opening 111. In this way the information reading unit 373 can read both the identification member 101 of the sample rack 10 and the identification member 201 of the sample container 20 from one side of the sample rack 10.

Although the examples shown in FIGS. 3A and 3B show the state in which the sample is stored in the sample container 20 after centrifugal separation, the present invention is not limited thereto inasmuch as the sample container 20 also may accommodate a sample transferred from a liquid after centrifugal separation. For example, as shown in FIG. 4A and FIG. 4B, the sample container 20 held by the container holding part 110 also may include only plasma as a sample.

In the state shown in FIG. 4A, the operator visually acquires that the distance from the lower end of the sample container 20 to the upper surface of the plasma region corresponds to the 3.5 scale units of the mark 141. The operator then determines that the amount of sample necessary for measurement is accommodated in the sample container 20 based on the fact that the 3.5 scale units obtained by visual inspection is greater than the three scale units corresponding to the amount of sample required for measurement. Similarly, in the state shown in FIG. 4B, the operator visually acquires that the distance from the lower end of the sample container 20 to the upper surface of the plasma region corresponds to one scale unit of the mark 141. Then, the operator determines that the amount of sample necessary for measurement is not accommodated in the sample container 20 based on the fact that the one scale unit obtained by visual observation is less than the three scale units corresponding to the amount of sample required for measurement.

As shown in FIGS. 4A and 4B, the height of the bottom surface of the container holding part 110 substantially coincides with the height of the bottom surface of the sample container 20 held by the container holding part 110. Accordingly, when a plurality of marks 141 are provided starting from the bottom surface of the container holding part 110, the amount of sample in the sample container 20 can be confirmed starting from the bottom surface of the sample container 20 held by the container holding part 110.

Note that there is no buffy coat area or red blood cell area in the example shown in FIG. 4A and FIG. 4B, unlike the cases of FIGS. 3A and FIG. 3B. Therefore, when the sample container 20 contains only plasma as shown in FIG. 4A and FIG. 4B, the number of scale units corresponding to the amount of sample required for measurement is determined in accordance with the diameter of the inside surface of the body 220 of the sample container 20, the measurement order set for the sample, the dead volume generated when transporting the suctioned sample, and the dead volume remaining on the bottom of the sample container 20 when suctioning.

Although an example in which the sample is plasma is shown in FIGS. 3A to 4B, but the liquid stored as the sample in the sample container 20 is not limited to plasma. That is, the sample contained in the sample container 20 and transported by the sample rack 10 is not limited to plasma, and may be whole blood, serum, urine, lymph fluid, body cavity fluid or the like. For example, if a measurement is performed on a sample for a blood cell test, the sample may be whole blood. For example, when the measurement is performed on a sample for blood coagulation test, immunoassay, or biochemical test, the sample may be plasma. For example, if a measurement is performed on a sample for an immunoassay or a biochemical test, the sample may be serum.

Next, a sample analyzer 30 that analyzes a sample using the sample rack 10 described above will be described.

In the following sample analyzer 30, the sample to be analyzed is plasma. The sample analyzer 30 performs measurement on a plasma sample, and analyzes the sample based on the measurement result.

Figure 5:
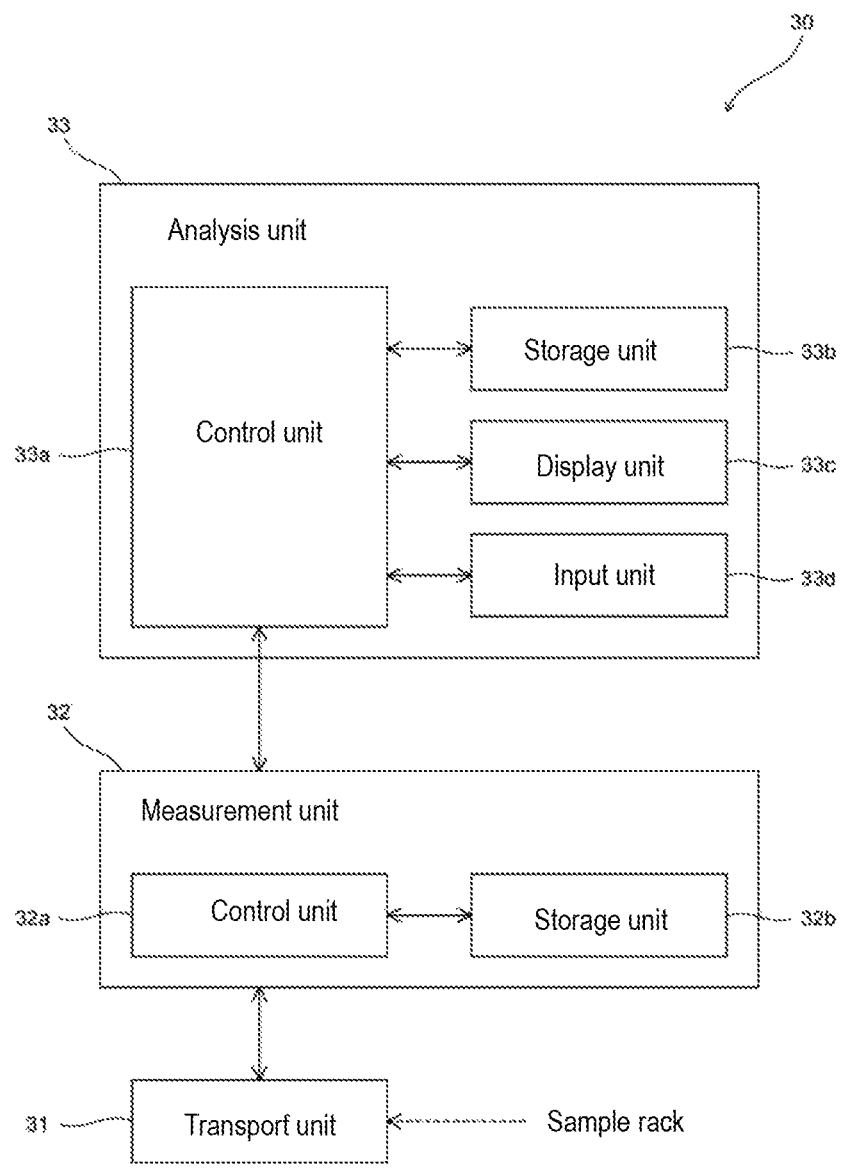
FIG. 5 is a block diagram showing the configuration of the sample analyzer according to the first embodiment.

As shown in FIG. 5, the sample analyzer 30 includes a transport unit 31, a measurement unit 32, and an analysis unit 33.

The transport unit 31 transports the sample rack 10 placed by the operator, and supplies the sample in the sample container 20 held by the sample rack 10 to the measurement unit 32.

The measurement unit 32 includes a control unit 32a, a storage unit 32b, and various mechanical units used for measurement described with reference to FIG. 6. Control unit 32a is, for example, a CPU. The storage unit 32b is, for example, a ROM, a RAM, and a hard disk. The control unit 32a controls each unit in the measurement unit 32 and the transport unit 31 in accordance with a program and data stored in the storage unit 32b. The control unit 32a suctions the sample supplied by the transport unit 31, executes measurements related to the blood coagulation test for the sample, and transmits the measurement results to the analysis unit 33.

The analysis unit 33 includes a control unit 33a, a storage unit 33b, a display unit 33c, and an input unit 33d. Control unit 33a is, for example, a CPU. The storage unit 33b is, for example, a ROM, a RAM, and a hard disk. The control unit 33a controls each part of the analysis unit 33 and the measurement unit 32 according to a program or data stored in the storage unit 33b. The control unit 33a analyzes the sample based on the measurement result received from the measurement unit 32. The display unit 33c is, for example, a liquid crystal display. The input unit 33d is, for example, a mouse or a keyboard. The display unit 33c and the input unit 33d may be integrally configured by a touch panel display or the like.

Figure 6:
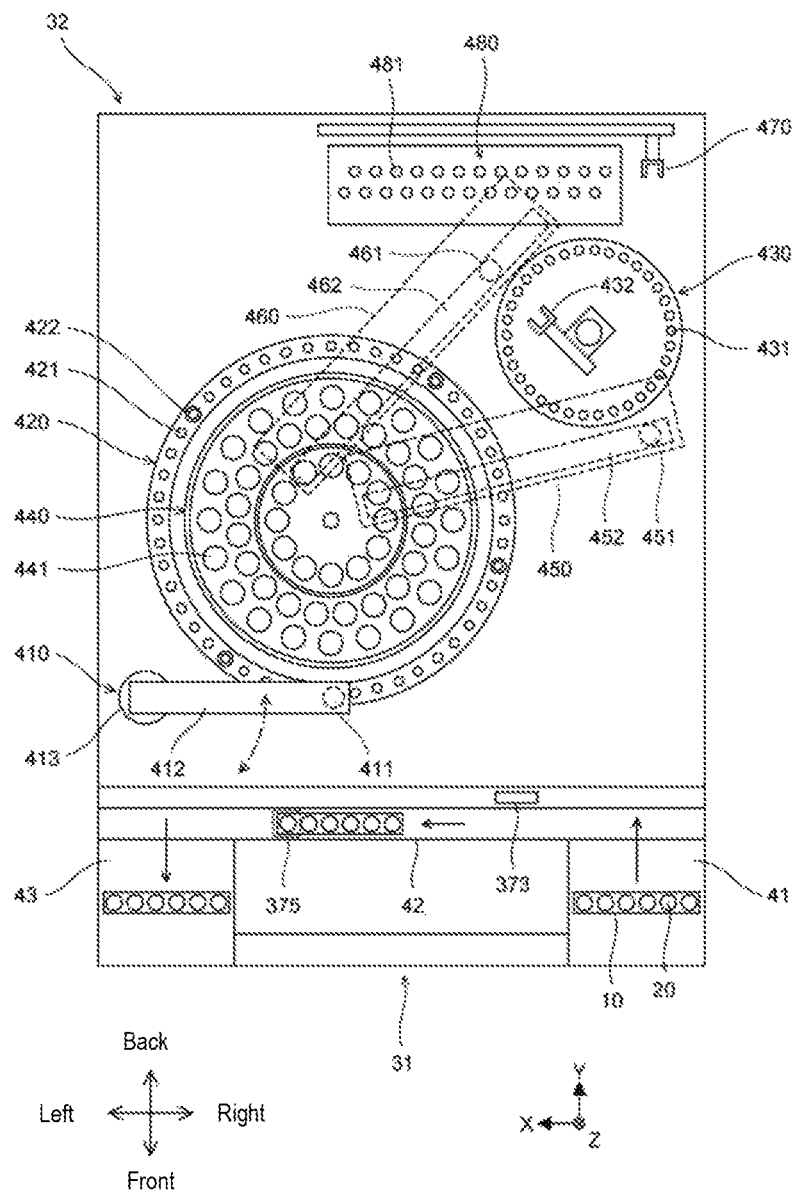
FIG. 6 is a schematic view showing a configuration when the transport unit and the measurement unit according to the first embodiment are viewed from above.

As shown in FIG. 6, the transport unit 31 includes a rack storage unit 41, a rack transport unit 42, a rack collection unit 43, and an information reading unit 373.

The operator sets the sample container 20 containing the sample in the sample rack 10, and as shown in FIG. 3A, 3B, or FIG. 4A, 4B, comprehends the amount of sample in the sample container 20 and determines whether the amount of sample required for measurement is accommodated. If the amount of sample necessary for measurement is not accommodated, the operator removes the sample container 20 from the sample rack 10. When the amount of sample necessary for measurement is accommodated, the operator rotates the sample container 20 around the Z-axis in the container holding part 110 to position the identification member 201 of the sample container 20 in the opening 111. Then, the operator installs the sample rack 10 in the rack storage unit 41.

The transport unit 31 moves the sample rack 10 installed in the rack storage unit 41 to the right end of the rack transport unit 42, and further transports the sample rack 10 to the front of the information reading unit 373. The information reading unit 373 reads the bar-code from the identification members 101 and 201 located in the rear of the transport area of the rack transport unit 42 and positioned in the front. Note that when the identification members 101 and 201 are RFID tags, the information reading unit 373 is an antenna for reading an RFID.

Thereafter, the transport unit 31 transports the sample rack 10 in the left direction, and sequentially positions the sample containers 20 at the suction position 375. The sample is suctioned from the sample container 20 at the suction position 375. The transport unit 31 transports the sample rack 10 to the rack collection unit 43 when the suction of the sample is completed for all the sample containers 20 held in the sample rack 10.

The measurement unit 32 includes a sample dispensing unit 410, a reaction container table 420, a heating table 430, a reagent table 440, reagent dispensing units 450 and 460, a transfer unit 470, and a detection unit 480.

The sample dispensing unit 410 includes a nozzle 411, an arm 412, and a mechanical unit 413. The nozzle 411 is mounted at the tip of the arm 412. The tip of the nozzle 411 is pointed to penetrate the stopper 210 of the sample container 20. The mechanical unit 413 is configured to rotate the arm 412 in the circumferential direction and to move the arm 412 in the vertical direction. In this way the nozzle 411 can move in the circumferential direction and in the vertical direction.

The sample dispensing unit 410 lowers the nozzle 411 from the upper side of the sample container 20 positioned at the suction position 375 to pierce the stopper 210. Then, the sample dispensing unit 410 suctions the sample from the sample container 20 via the nozzle 411, and discharges the suctioned sample to the reaction container 422 held by the holding hole 421 of the reaction container table 420. The amount of sample suctioned by the sample dispensing unit 410 is the sum of the minimum required amount of sample for measurement of the measurement items set for the sample, and the dead volume generated when transporting the suctioned sample.

The reaction container table 420 has an annular shape in plan view, and is disposed on the outside of the reagent table 440. The reaction container table 420 is configured to be rotatable in the circumferential direction. The reaction container table 420 has a plurality of holding holes 421 for holding the reaction container 422.

The heating table 430 includes a plurality of holding holes 431 for holding the reaction container 422, and a transfer unit 432 for transferring the reaction container 422. The heating table 430 has a circular outline in plan view, and is configured to be rotatable in the circumferential direction. The heating table 430 heats the reaction container 422 set in the holding hole 431 to 37° C.

When a sample is discharged to the reaction container 422 held on the reaction container table 420, the reaction container table 420 is rotated, and the reaction container 422 containing the sample is transferred to the vicinity of the heating table 430. Then, the transfer unit 432 of the heating table 430 holds the reaction container 422 and sets it in the holding hole 431 of the heating table 430.

The reagent table 440 is configured to be capable of having a plurality of reagent containers 441 containing reagents used for measurement related to a blood coagulation test. The reagent table 440 is configured to be rotatable in the circumferential direction. A plurality of reagent containers 441 containing reagents used in measurement of measurement items are installed on the reagent table 440.

The reagent dispensing unit 450 includes a nozzle 451 and a mechanical unit 452. The mechanical unit 452 is configured to move the nozzle 451 in the vertical direction and to move the nozzle 451 in the horizontal direction so as to cross the reagent table 440. Similarly, the reagent dispensing unit 460 includes a nozzle 461 and a mechanical unit 462. The mechanical unit 462 is configured to move the nozzle 461 in the vertical direction and to move the nozzle 461 in the horizontal direction to cross the reagent table 440. The reagent dispensing units 450 and 460 are installed below the upper surface of the measuring unit 32.

The reagent dispensing units 450 and 460 dispense the reagent into the reaction container 422 heated by the heating table 430. When dispensing the reagent, the transfer unit 432 or the transfer unit 470 takes out the reaction container 422 from the holding hole 431 of the heating table 430 and positions it at a predetermined position near the heating table 430. Then, the reagent dispensing unit 450, 460 suctions the reagent from the reagent container 441 through the nozzle 451, 461, and discharges the suctioned reagent to the reaction container 422. In this way the reagent is mixed with the sample to prepare a measurement sample. Thereafter, the transfer unit 470 sets the reaction container 422 in the holding hole 481 of the detection unit 480.

The measurement principle of the detection unit 480 is, for example, a coagulation method, a synthetic substrate method, an immunoturbidimetric method, an agglutination method, or the like. The detection unit 480 includes a plurality of holding holes 481. The detection unit 480 irradiates light on the reaction container 422 set in the holding hole 481, receives the light transmitted through the measurement sample, and outputs a signal according to the received light intensity. The control unit 32a of the measurement unit 32 stores the signal output from the detection unit 480 as a measurement result, and transmits the measurement result to the analysis unit 33.

The control unit 33a of the analysis unit 33 illustrated in FIG. 5 performs analysis related to a blood coagulation test of the sample based on the measurement result received from the measurement unit 32. Specifically, the control unit 33a performs analysis of measurement items such as PT, APTT, Fbg, extrinsic coagulation factor, intrinsic coagulation factor, coagulation factor XIII, HpT, TTO, FDP, D dimer, PIC, FM, ATIII, Plg, APL, APL, PC, VWF: Ag, VWF: RCo, ADP, collagen, epinephrine and the like.

Next, detailed configurations of the sample rack 10 and the transport unit 31 will be described.

Figure 7:
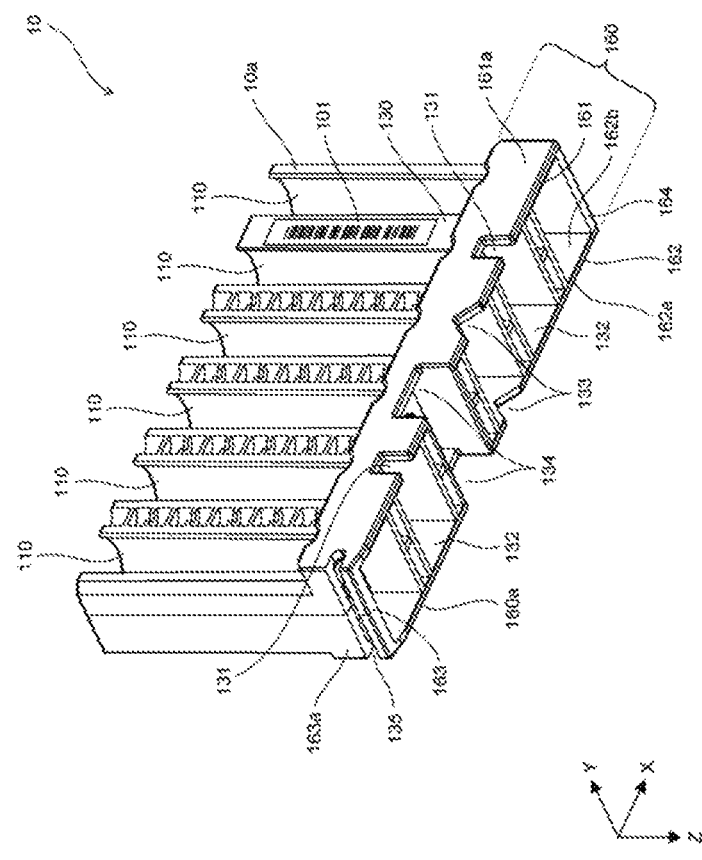
FIG. 7 is a perspective view showing a configuration of the sample rack according to the first embodiment.

As shown in FIG. 7, the pedestal part 160 is provided below the container holding part 110. The pedestal part 160 includes plates 161 and 162 parallel to the XZ plane and plates 163 and 164 parallel to the YZ plane. The plates 161 and 162 are located on the Y-axis positive side and the Y-axis negative side of the pedestal part 160, respectively. The plates 163 and 164 are located on the X-axis negative side and the X-axis positive side of the pedestal part 160, respectively. The side 161a on the Y-axis positive side of the plate 161, the side 162a on the Y-axis negative side of the plate 162, and the side 163a on the X-axis negative side of the plate 163 form the outer side of the pedestal part 160. The inner side surface 162b on the Y-axis positive side of the plat 162 is illustrated in FIG. 7.

The bottom surface 160a of the pedestal part 160 is formed by the lower ends of the plates 161 to 164. A cavity is formed inside the pedestal part 160 surrounded by the plates 161 to 164, and the cavity is opened in the positive Z-axis direction. In other words, a concavity is formed on the bottom surface 160a of the pedestal part 160 surrounded by the plates 161 to 164.

Two notches 131 are formed in the plate 161, and a wall 132 is formed on the inside surface 162b of the plate 162 so as to face the two notches 131. As shown in FIG. 7, the wall 132 is configured by the inside surface 162b of the plate 162.

An engagement part 133 also is provided on the bottom surface 160a of the sample rack 10. The engagement part 133 in the first embodiment is a notch provided on the side surfaces 161a and 162a. The two notches forming the engagement part 133 are provided to face each other in the Y-axis direction. The engagement part 133 has a triangular shape when viewed in the Y-axis direction. The engagement part 133 engages with a protrusion 312 provided on the bottom surface 41a of the rack storage unit 41 and extends in the direction toward the transport path 42a as described later.

Similarly, an engagement part 134 is provided on the bottom surface 160a of the sample rack 10. The engagement part 134 of the first embodiment is a notch provided on the side surfaces 161a and 162a. The two notches that configure the engagement part 134 are provided so as to face each other in the Y-axis direction. The engagement part 134 has a rectangular shape when viewed in the Y-axis direction. The engagement part 134 engages with a protrusion 361 provided on a belt 360 for transporting the sample rack 10 in the transport path 42a as described later.

An engagement part 135 also is provided on the side surface 163a of the sample rack 10. The engagement part 135 is a notch formed in the plate 163 and penetrates the plate 163 in the Y-axis direction. The engagement part 135 engages with a protrusion 313 which is provided on the side portion of the rack storage unit 41 and extends in the direction toward the transport path 42a, as described later.

As shown in FIG. 8, the rack storage unit 41 includes a support member 310, a regulating member 320, and a feeding member 330.

The sample rack 10 set in the rack storage unit 41 is supported by the bottom surface 41a of the rack storage unit 41. The bottom surface 41a of the rack storage unit 41 is configured by the upper surface of the support member 310. The support member 310 is a plate-like member that spreads in the horizontal direction. The regulating member 320 has a U-shape as viewed in the Z-axis direction. Two claws 321 are formed on the regulating member 320. The claws 321 can be projected from the lower side of the bottom surface 41a into the inside of the rack storage unit 41 through the holes 311 formed in the support member 310.

A protrusion 312 extending in the Y-axis direction is provided on the upper surface of the support member 310. The protrusion 312 is provided at a position corresponding to the engagement part 133 of the sample rack 10. That is, the protrusion 312 is provided on the upper surface of the support member 310 such that the engagement part 133 of the sample rack 10 set in the rack storage unit 41 engages with the protrusion 312.

Thus, when the sample rack 10 is provided with the engagement part 133 and the rack storage unit 41 is provided with the protrusion 312, the movement of the sample rack 10 in the rack storage unit 41 is performed with the engagement part 133 along the protrusion 312. Therefore, the operator can reliably set the sample rack 10 in the rack storage unit 41 by sliding the sample rack 10 relative to the regulating member 320 in a state where the engagement part 133 is along the protrusion 312. The feeding member 330 for transporting the sample rack 10 set in the rack storage unit 41 to the transport path 42a can reliably transport the sample rack 10 to the transport path 42a along the transport direction.

A protrusion 313 extending in the Y-axis direction is formed at the end of the support member 310 on the X-axis negative side. The protrusion 313 on the side portion of the rack storage unit 41 is provided at a position corresponding to the engagement part 135 of the sample rack 10. That is, the protrusion 313 is provided at the X-axis negative end of the support member 310 such that the engagement part 135 of the sample rack 10 set in the rack storage unit 41 engages with the protrusion 313.

In this way, when the engagement part 135 is provided on the sample rack 10 and the protrusion 313 is provided on the rack storage unit 41, the movement of the sample rack 10 in the rack storage unit 41 is performed with the engagement part 135 along the protrusion 313. Therefore, the operator can reliably set the sample rack 10 in the rack storage unit 41 by sliding the sample rack 10 relative to the regulating member 320 in a state where the engagement part 135 is along the protrusion 313. The feeding member 330 for transporting the sample rack 10 set in the rack storage unit 41 to the transport path 42a can reliably transport the sample rack 10 to the transport path 42a along the transport direction.

The two feeding members 330 are disposed on a member 351 provided below the support member 310. The two feeding members 330 move in the Y-axis direction by moving the member 351 in the Y-axis direction.

The rack transport unit 42 includes two belts 360, motors 371 and 372, an information reading unit 373, and a pushing member 374. The transport path 42a of the rack transport unit 42 is configured by the upper surfaces of the two belts 360 and is used to transport the sample rack 10.

The two belts 360 extend parallel to each other in the X-axis direction, and are connected to pulleys at the X-axis positive end side and X-axis negative end side. The motor 371 rotates a pulley to which the belt 360 on the Y-axis positive side is connected to drive the belt 360 on the Y-axis positive side. The motor 372 rotates the pulley to which the belt 360 on the Y-axis negative side is connected to drive the belt 360 on the Y-axis negative side. The two belts 360 each include one protrusion 361 that protrudes in the Z-axis negative direction. The width of the protrusion 361 in the X-axis direction is set such that the engagement part 134 of the sample rack 10 engages with the protrusion 361.

When the sample rack 10 is fed from the rack storage unit 41 to the rack transport unit 42, one of the two belts 360 is driven, and the protrusion 361 is aligned with the position of the engagement part 134 of the sample rack 10. In this state, the claw 321 of the regulating member 320 is moved to the lower side of the bottom surface 41a of the rack storage unit 41, and the feeding member 330 pushes the side surface 162a of the sample rack 10. In this way the sample rack 10 of the rack storage unit 41 is fed into the transport path 42a of the rack transport unit 42, and the engagement part 134 of the sample rack 10 engages with the projection 361 of the belt 360.

Note that when a plurality of sample racks 10 are stored in the rack storage unit 41, the feeding member 330 pushes the sample rack 10 on the most negative side of the Y-axis among the stored sample racks 10 to move all the sample racks 10 in the Y-axis direction. In this way the sample rack 10 located on the most positive side of the Y-axis is fed into the transport path 42a.

When the engagement part 134 of the sample rack 10 and the protrusion 361 of the belt 360 engage, the belt 360 is driven in a state wherein the engagement part 134 and the protrusion 361 are engaged, and thus the sample rack 10 is transported in the X-axis positive direction. In this way, when the engagement part 134 is provided in the sample rack 10 and the protrusion 361 is provided in the belt 360, the sample rack 10 can be transported along the transport path 42a with a simple configuration. Since the sample rack 10 can be transported to the suction position 375 provided in the rack transport unit 42 just by driving the belt 360, the rack transport unit 42 can be configured simply.

The information reading unit 373 reads the identification member 101 of the sample rack 10 transported by the rack transport unit 42. The information reading unit 373 also reads the bar-code from the identification member 201 of the sample container 20 held by the sample rack 10 through the opening 111 of the sample rack 10. Thereafter, the sample rack 10 is transported in the X-axis direction so that the plurality of sample containers 20 being held are sequentially positioned at the suction position 375 of the measurement unit 32. When the suction is completed for all the sample containers 20, the sample rack 10 is positioned at the end on the X-axis positive side of the transport path 42a. Then, the pushing member 374 pushes the side surface 161a on the Y-axis positive side of the sample rack 10 in the Y-axis negative direction, and the sample rack 10 is fed onto the support member 380 of the rack collection unit 43. In this way the sample rack 10 is collected by the rack collection unit 43.

Figure 9A:
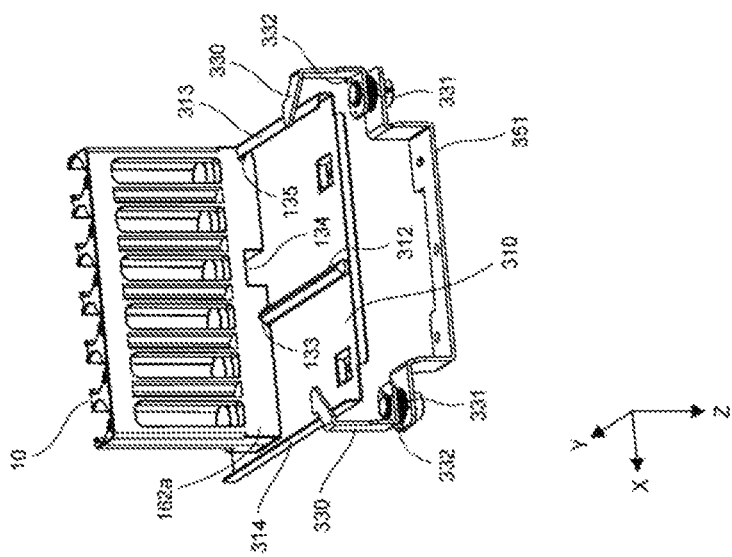
FIG. 9A and FIG. 9B are perspective views showing configurations of a sample rack and a rack storage unit according to the first embodiment.
Figure 9B:
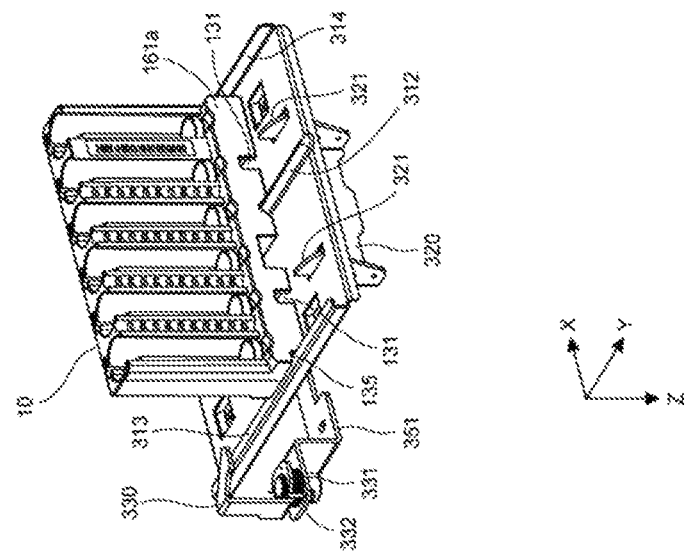
Figure 17:
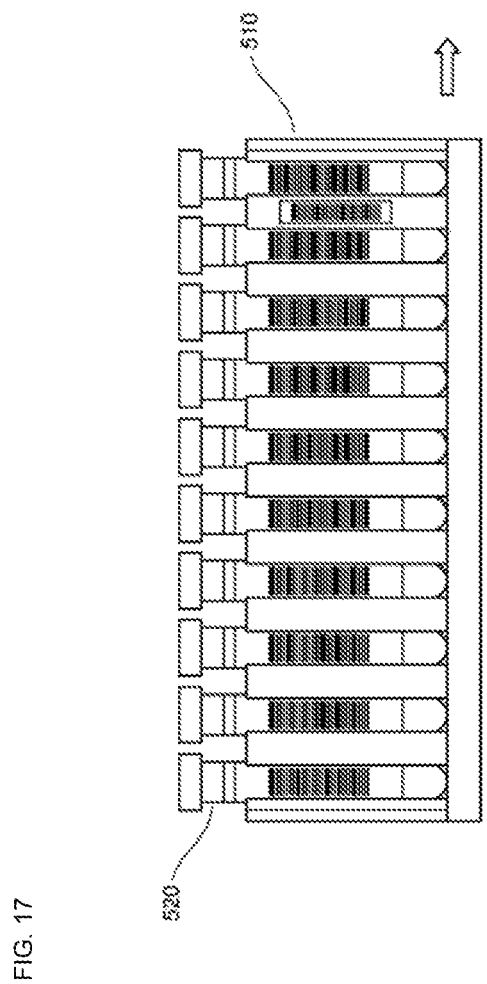
FIG. 17 is a schematic view illustrating a configuration according to the related art.

As shown in FIGS. 9A and 9B, the protrusion 312 provided on the upper surface of the support member 310 extends in the Y-axis direction, and has a triangular shape when viewed in the Y-axis direction. A protrusion 313 extending in the Y-axis direction is formed at the end of the support member 310 on the X-axis negative side. The protrusion 313 protrudes in the X-axis negative direction relative to a wall parallel to the YZ plane formed on the upper surface of the support member 310. The protrusion 313 is formed of a plate-like portion parallel to the horizontal surface. A wall 314 extending in the Y-axis direction is formed at the end of the support member 310 on the X-axis positive side. The wall 314 is formed on the upper surface of the support member 310 and is formed of a plate-like portion parallel to the YZ plane. The protrusion 313 and the wall 314 define the range of the rack storage unit 41 in the X-axis direction.

When setting the sample rack 10 in the rack storage unit 41, the operator engages the engagement part 135 of the sample rack 10 with the protrusion 313 in the negative X-axis direction, and the engagement part 313 of the sample rack 10 engages with the protrusion 312. In this way the sample rack 10 is properly arranged on the support member 310. Then, the operator manually moves the sample rack 10 placed on the support member 310 in the Y-axis positive direction. The claws 321 of the regulating member 320 are provided at positions corresponding to the notches 131. In this way the claws 321 protruding upward from the upper surface of the support member 310 enter the inside of the sample rack 10 through the notches 131 and are pressed against the wall 132.

The regulating member 320 includes two claws 321 at positions corresponding to the two notches 131 of the sample rack 10. The contact of the claws 321 with the wall 132 of the sample rack 10 prevents the sample rack 10 from being unintentionally moved from the rack storage unit 41 to the transport path 42a. Note that the number of claws 321 provided on the regulating member 320 is not limited to two, and may be one or three or more in accordance with the number of notches 131.

The two feed members 330 are respectively installed at the X-axis positive side end and the X-axis negative side end of the member 351. The feed member 330 is installed on the member 351 so as to be rotatable about the Z-axis. The X-axis positive feed member 330 is biased by the spring 331 so as to rotate counterclockwise as viewed in the Z-axis positive direction, and the X-axis negative feed member 330 is biased by a spring 331 so as to rotate in the clockwise direction as viewed in the Z-axis positive direction. The rotational position is fixed when the delivery member 330 delivers the sample rack 10 is fixed by the feed member 330 hitting the stopper 332.

When the feed member 330 feeds the sample rack 10, the feed member 330 is moved by the member 351 from the Y-axis negative end of the rack storage unit 41 in the Y-axis positive direction, and pushes the side surface 162a on the Y-axis negative side of the sample rack 10. When the feeding is completed, the feed member 330 is returned to the Y-axis negative end of the rack storage unit 41 again. At this time, when the sample rack 10 is in the rack storage unit 41, the feeding member 330 rotates around the Z axis by hitting the side surface 161a on the Y axis positive side of the sample rack 10, and retracts from the inside of the rack storage unit 41. In this way the feeding member 330 is returned to the Y-axis negative end of the rack storage unit 41 without being blocked by the sample rack 10.

Next, the amount of sample required for measurement and the number of scale units corresponding to the amount of sample required for measurement will be described in detail by way of an example.

A measurement order indicating whether to perform a measurement has been set beforehand for the sample accommodated in the sample container 20. For example, when a measurement order including three types of measurement items of PT, APTT, and Fbg is set for a certain sample, the measurement of each measurement item requires a predetermined amount of sample in order to perform all three types of measurement on this sample. When suctioning the sample from the sample container 20 and preparing the measurement sample, the sample that cannot be used for measurement remains in the nozzle 411 or the like of the sample dispensing unit 410. When the plasma sample is positioned in the upper layer in the sample container 20, the plasma sample must be suctioned from above the buffy coat to a certain extent in order to prevent erroneous suction of buffy coat and erythrocytes from the blood cells. When only the sample is stored in the sample container 20 and the sample is suctioned from the sample container 20, the sample that cannot be suctioned remains on the bottom of the sample container 20.

Therefore, when plasma is positioned above the liquid as shown in FIG. 10A, the amount of sample required for measurement is a value obtained by adding the total of the amount of sample required for measurement of the measurement items set for the sample, the dead volume generated when transporting the suctioned sample, and the dead volume for preventing erroneous suction of blood cells. When only the plasma is stored in the sample container 20 as shown in FIG. 10B, the amount of sample necessary for measurement is a value obtained by adding the total of the amount of sample required for measurement of the measurement items set for the sample, the dead volume generated when transporting the suctioned sample, and the dead volume remaining on the bottom of the sample container 20 when suctioning.

Specifically, in the measurement unit 32 that performs measurement related to blood coagulation, the sample amounts required for the measurement items PT, APTT, and Fbg are 50 µL, 50 µL, and 10 µL, respectively. The dead volume when transporting the suctioned sample is about 100 µL. When the diameter of the inner surface of the body 220 of the sample container 20 is 9.4 mm, the dead volume for preventing blood cell suctioning is about 600 µL and the dead volume remaining on the bottom of the sample container 20 is about 600 µL. In this case, as shown in FIG. 10A, the height of the plasma region corresponding to the dead volume for preventing blood cell erroneous suction is 7.5 mm. As shown in FIG. 10B, the height of the plasma region corresponding to the dead volume remaining on the bottom of the sample container 20 is 12.0 mm.

Here, when the diameter of the inner surface of the body 220 of the sample container 20 is d3, the total amount of sample required for measurement of each measurement item set in the measurement order is V1, the dead volume of sample for transport is V2, and the height of the plasma region in the sample container 20 corresponding to V1+V2 is H, the relationship between d3, H, V1, and V2 is calculated by the following equation.

$$\pi \times (d3/2)2 \times H = V1 + V2$$

Here, when d3=9.4 mm, V1=50 µL+50 µL+10 µL, and V2=100 µL are substituted into the above equation, H=3.0 mm.

Therefore, when plasma is positioned above the liquid as shown in FIG. 10A, the vertical length of the sample required for measurement is 10.5 mm. As shown in FIG. 10B, when only the plasma is stored in the sample container 20, the length in the vertical direction of the sample necessary for the measurement is 15.0 mm. Therefore, since the distance between the marks 141 is 5 mm, the amount of sample necessary for measurement is set to 2 scale units in the example shown in FIGS. 3A and 3B, and set to three scale units in the example shown in FIGS. 4A and 4B.

The vertical length of the sample required for measurement is in a range of about several millimeters to several tens of millimeters in accordance with the diameter of the inner surface of the body 220 of the sample container 20 that can be held by the sample rack 10 and the measurement items set in the measurement order. Therefore, the operator can easily comprehend the amount of the sample in the sample container 20 by setting the distance between the plurality of marks 141 to 1 mm or more and 10 mm or less. In the case as shown in FIGS. 3A and 3B, it is preferable to suction the plasma by keeping the nozzle 5 mm or more above the buffy coat. Therefore, by setting the distance between the marks 141 to 2 mm or more and 5 mm or less, it can be easily grasped in advance whether there is a plasma layer 5 mm or more in the upward direction from the buffy coat.

Next, other embodiments of the sample rack 10 will be described. In the following second to seventh embodiments, the configuration other than the sample rack 10 is the same as that of the first embodiment. In the second to fifth embodiments, only the mark 141 and the identifier 142 provided on the flat surface 140 adjacent to the container holding part 110 at the position 16 are shown, but the mark 141 and the identifier 142 are similarly provided in other flat surfaces 140.

Second Embodiment

In the sample rack 10 of the second embodiment shown in FIG. 11A, as compared with the first embodiment, the mark 141 is configured by a convex part protruding in the Y-axis positive direction on the flat surface 140, and the identifier 142 is configured by a convex part which protrudes in the Y-axis positive direction on the mark 141. In the second embodiment, the mark 141 and the identifier 142 are provided at the same position as the mark 141 and the identifier 142 shown in FIG. 1. Also in the second embodiment, as in the first embodiment, the operator can quickly and easily comprehend the amount of sample in the sample container 20 held by the container holding part 110 by using the mark 141 and the identifier 142.

In FIG. 11A, note that the identifier 142 also may be configured by a notch formed in the mark 141.

As shown in FIG. 11B, the identifier 142 also may be formed on the X axis positive side of the mark 141. In FIG. 11B, the mark 141 and the identifier 142 also may be configured by a recess formed in the flat surface 140.

Note that, in the example shown in FIG. 11B, the interval of the identifiers 142 is twice the interval of the marks 141, but also may not be an integral multiple of the interval of the marks 141. For example, the spacing of the identifiers 142 may be 1.5 times the spacing of the marks 141. In this case, the position of some of the plurality of identifiers 142 is located at a position different from the position of the mark 141.

As shown in FIG. 12A, the mark 141 also may be formed by a concavity recessed in the Y-axis negative direction in the flat surface 140, and the identifier 142 may be provided at a center position of the mark 141 formed by the concavity in the X-axis direction in a portion of the plane 140. In FIG. 12A, the identifier 142 configured as a part of the flat surface 140 may be configured by a convexity protruding from the flat surface 140 in the Y-axis positive direction.

Third Embodiment

As shown in FIG. 12B, in the sample rack 10 of the third embodiment, a label 143 is attached to the flat surface 140. The label 143 is provided with the mark 141 and the identifier 142 as a graphic printed on the label at the same position as the mark 141 and the identifier 142 shown in FIG. 11B. Also in the third embodiment, as in the first embodiment, the operator can quickly and easily comprehend the amount of sample in the sample container 20 held by the container holding part 110 by using the mark 141 and the identifier 142. It also is possible to easily change the distance between the mark 141 and the identifier 142 by replacing the label 143.

Note that in FIG. 12B each mark 141 and each identifier 142 may be a label individually attached to the flat surface 140. The mark 141 and the identifier 142 are not limited to the label or the graphic printed on the label, and may be a predetermined ornamentation indicating the position in the Z-axis direction on the flat surface 140. For example, the mark 141 and the identifier 142 may be configured by a scale unit of a ruler printed on the sample rack 10.

Fourth Embodiment

In the sample rack 10 of the fourth embodiment shown in FIG. 13A, the mark 141 and the identifier 142 are provided only upward from the center position in the vertical direction of the container holding part 110 compared to the first embodiment. In this way, when the mark 141 and the identifier 142 are provided at least at the upper part relative to the center in the vertical direction of the container holding part 110 and, for example, the sample is plasma and the separated plasma is positioned in the upper layer in the sample container 20, the amount of plasma in the sample container 20 can be understood by the plurality of marks 141 and the identifiers 142.

Note that as shown in FIG. 13B, the mark 141 and the identifier 142 may be provided only downward from the center position in the vertical direction of the container holding part 110. As described above, when the mark 141 and the identifier 142 are provided at least at the lower part relative to the center in the vertical direction of the container holding part 110 and the sample container 20 contains only a small amount of sample, the amount of sample in the sample container 20 can be comprehended by a plurality of marks 141 and the identifiers 142. One mark 141 also may be provided above or below the center position of the container holding part 110 in the vertical direction.

Fifth Embodiment

As shown in FIG. 14A, in the sample rack 10 of the fifth embodiment, one mark 141 is formed on the flat surface 140. The mark 141 in this case is configured by a convexity that protrudes in the Y-axis positive direction on the flat surface 140. In the sample container 20 held by the container holding part 110, when the separated plasma is positioned in the upper layer in the sample container 20 and the amount of sample necessary for measurement is accommodated therein, in general the liquid level of the plasma is positioned above a predetermined height H2 in the vertical direction of the container holding part 110. The mark 141 shown in FIG. 14A is disposed at the position of the predetermined height H2 in this case. That is, the mark 141 indicates the amount of sample necessary for measurement.

Therefore, the operator quickly and easily compares the liquid level of the plasma in the sample container 20 held by the container holding part 110 with the position of the mark 141 to determine whether the amount of sample necessary for measurement is accommodated in the sample container 20. Specifically, when the liquid level of plasma is lower than the mark 141, the operator can determine that the sample necessary for measurement is not accommodated in the sample container 20, and when the liquid level of plasma exceeds the mark 141 the operator can determine that the sample necessary for measurement is stored in the sample container 20. Hence, the burden on the operator when checking the sample amount can be reduced.

Note that even when the sample container 20 held by the container holding part 110 contains only the sample, the mark 141 may be disposed at the liquid surface of the sample when the amount of sample required for measurement is accommodated therein. The mark 141 is not limited to a convexity and also may be configured by a concavity and a label. The mark 141 also may be configured by a slider that can move up and down on the flat surface 140.

The mark 141 shown in FIG. 14A also may have a width H3 in the vertical direction as shown in FIG. 14B. The width in the vertical direction of the mark 141 shown in FIG. 14B is set to the width in the vertical direction of the sample when the amount of sample necessary for measurement is stored in the sample container 20. In this case, even if the position of the lower surface and upper surface of the sample fluctuates in the sample container 20 depending on the subject, the operator can easily compare the width of the sample in the sample container 20 in the vertical direction and the width in the vertical direction of the mark 141 adjacent to the container holding part 110. Hence, the amount of sample in the sample container 20 held by the container holding part 110 can be comprehended quickly and easily.

Sixth Embodiment

In the sixth embodiment shown in FIG. 15, the vertical intervals of the marks 141 and the identifiers 142 disposed on the four flat surfaces 140 are mutually different. In other words, in the sixth embodiment, a first mark group in which the marks 141 are aligned in the vertical direction on one flat surface 140 and a second mark group in which the marks 141 are aligned in the vertical direction on another flat surface 140 have mutually different spacing of the plurality of marks 141 of the first mark group and spacing of the plurality of marks 141 of the second mark group.

Specifically, in the flat surface 140 located at the position 171 between the container holding part 110 at position 12 and the container holding part 110 at position 13, the distance between the marks 141, that is, the length of one scale unit, is 1 mm. In the flat surface 140 located at position 172 between the container holding part 110 of position 13 and the container holding part 110 of position 14, the distance between the marks 141, that is, the length of one scale unit, is 2 mm. In the flat surface 140 located at position 173 between the container holding part 110 at position 14 and the container holding part 110 at position 15, the distance between the marks 141, that is, the length of one scale unit, is 3 mm. In the flat surface 140 located at the position 174 between the container holding 110 at position 15 and the container holding part 110 at position 16, the distance between the marks 141, that is, the length of one scale unit, is 5 mm.

As described above, when the intervals between the marks 141 at positions 171 to 174 are different from each other, the operator can appropriately comprehend the amount of sample in the sample container 20 using the appropriate marks 141 for the sample container 20 by using the marks 141 at positions 171 to 174 according to the width in the vertical direction of the sample in the sample container 20.

Note that the change of the interval of the mark 141 is not restricted to being performed for every flat surface 140. On one flat surface 140, for example, the distance between the lower half marks 141 and the distance between the upper half marks 141 may be different. The interval between the marks 141 adjacent in the vertical direction on one flat surface 140 also may set to gradually increase or gradually decrease from the bottom surface of the container holding part 110 to the top surface of the sample rack 10.

Seventh Embodiment

In the seventh embodiment shown in FIGS. 16A to 16C, three types of sample racks 10 are used according to the arrangement interval of the marks 141 and the identifiers 142. The intervals of the marks 141 of the three types of sample racks 10 are mutually different. The three types of sample racks 10 have different colors. In other words, in the seventh embodiment, the color to be given to the sample rack 10 is set in accordance with the type of the interval between the plurality of marks 141.

Specifically, in the sample rack 10 shown in FIG. 16A, the distance between the marks 141, that is, the length of one scale unit, is 5 mm as in the case of FIG. 1. The color of the sample rack 10 in FIG. 16A is green. In the sample rack 10 shown in FIG. 16B, the distance between the marks 141, that is, the length of one scale unit, is 2 mm. The color of the sample rack 10 of FIG. 16B is yellow. In the sample rack 10 shown in FIG. 16C, the distance between the marks 141, that is, the length of one scale unit, is 1 mm. The color of the sample rack 10 in FIG. 16C is red.

As described above, when there are a plurality of sample racks 10 having different intervals of the mark 141, the operator can appropriately understand the amount of sample in the sample container 20 using appropriate marks 141 on the sample container 20 by using the sample rack 10 corresponding to the width in the vertical direction of the sample in the sample container 20. Since the operator can reliably use a suitable sample rack 10 since the operator can identify the sample racks 10 having different spacings of the marks 141 by color.

What is claimed is:

1. A sample rack used to hold a sample container containing a sample and to transport the held sample container, comprising:
   a container holding part configured to hold the sample container; and
   a plurality of marks indicating an amount of the sample stored in the sample container held by the container holding part, the marks sequentially arranged in a surface adjacent the container holding part and separated from each other by a predetermined distance by respective recesses in the surface.

2. The sample rack according to claim 1, wherein the plurality of marks are arranged sequentially at equal intervals as planar shelves having a width and a depth to define the respective recesses in the surface.

3. The sample rack according to claim 2, wherein the predetermined distance between the plurality of marks is 1 mm or more and 10 mm or less.

4. The sample rack according to claim 2, wherein the predetermined distance between the plurality of marks is 2 mm or more and 5 mm or less.

5. The sample rack according to claim 1, further comprising:
   identifiers respectively arranged for particular marks among the plurality of marks, the particular marks arranged with a predetermined number of marks therebetween.

6. The sample rack according to claim 5, wherein each of the identifiers comprises a respective notch in the particular marks, each notch forming a channel between adjacent respective recesses.

7. The sample rack according to claim 1, wherein the plurality of marks include a first mark group in which the marks are arranged in a vertical direction, and a second mark group in which the marks are arranged in the vertical direction; and
   the predetermined distance defined by the respective recesses between the marks of the first mark group and the predetermined distance defined by the respective recesses between the marks of the second mark group are different from each other.

8. The sample rack according to claim 1, wherein at least the container holding part includes a color indicative of the predetermined distance separating the plurality of marks.

9. The sample rack according to claim 1, wherein
the plurality of marks are arranged in a vertical direction of the sample rack.

10. The sample rack according to claim 1, wherein
The marks include a mark on an upper side relative to a center in a vertical direction of the container holding part to indicate a plasma region in the sample container, the plasma region containing an amount of separated plasma included in the sample.

11. The sample rack according to claim 1, wherein
the marks include a mark on at least at a lower side relative to a center in a vertical direction of the container holding part to indicate an erythrocyte region in the sample container, the erythrocyte region containing an amount of red blood cells included in the sample.

12. The sample rack according to claim 1, wherein
the marks are arranged starting from a bottom surface of the container holding part.

13. The sample rack according to claim 1, wherein
the marks are configured by a predetermined shape formed on the sample rack or a predetermined ornamentation attached to the sample rack.

14. The sample rack according to claim 1, wherein
the marks are configured by an unevenness formed on the sample rack.

15. The sample rack according to claim 1, wherein
the marks are provided adjacent to the container holding part.

16. The sample rack according to claim 1, comprising
a plurality of container holding parts each configured to hold the sample container, wherein
the marks are disposed between two adjacent container holding parts.

17. The sample rack according to claim 1, further comprising
a side surface, the side surface being a planar surface having a space on which an identification member for identifying the sample rack is adhered.

18. The sample rack according to claim 1, further comprising:
a plurality of container holding parts each configured to hold the sample container; and
a side surface having a plurality of openings provided in correspondence with the plurality of container holding parts, each opening being formed to allow an information reading unit provided in a sample analyzer to read an identification member that is adhered to the sample container held in the container holding part to identify the sample,
wherein the surface is included in the side surface such that the marks and the recesses are disposed between two adjacent openings.

19. A sample rack used to hold a sample container containing a sample and to transport the held sample container, comprising:
a container holding part configured to hold the sample container containing the sample;
a plurality of marks arranged at equal intervals, the marks sequentially arranged adjacent the container holding part and separated from each other by a predetermined distance by respective recesses; and
identifiers respectively arranged for particular marks among the plurality of marks, the particular marks arranged with a predetermined number of marks therebetween, wherein each of the identifiers comprises a respective notch in the particular marks, each notch forming a channel between adjacent respective recesses.

20. A sample rack used to hold a sample container containing a sample and to transport the held sample container, comprising:
a container holding part configured to hold the sample container containing the sample; and
a plurality of marks arranged at equal intervals starting from a bottom surface of the container holding part, wherein the marks are formed in a side face surface adjacent the container holding part and the equal intervals define respective recesses having a depth in the side face surface between each of the marks.

21. A sample rack used to hold a sample container containing a sample and to transport the held sample container, comprising:
a plurality of container holding parts each configured to hold the sample container containing the sample; and
more than one marks formed from a surface located between each of the container holding parts, the respective more than one marks having a depth into the surface to define recesses in the surface above and below each of the respective more than one marks, the more than one marks arranged horizontally at a same height position with respect to each other such that the recesses above and below each of the respective more than one marks are horizontally aligned, and each of the more than one marks and the recesses above and below each of the respective more than one marks are disposed in different respective surfaces between two adjacent container holding parts.

* * * * *